(12) United States Patent
Suzuki et al.

(10) Patent No.: US 10,732,454 B2
(45) Date of Patent: Aug. 4, 2020

(54) LAMINATED FILM, MANUFACTURING METHOD THEREOF, POLARIZING PLATE, LIQUID CRYSTAL PANEL, AND LIQUID CRYSTAL DISPLAY DEVICE

(71) Applicant: FUJIFILM Corporation, Tokyo (JP)

(72) Inventors: Masaaki Suzuki, Kanagawa (JP); Katsuyuki Takada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 15/937,000

(22) Filed: Mar. 27, 2018

(65) Prior Publication Data

US 2018/0217444 A1 Aug. 2, 2018

Related U.S. Application Data

(63) Continuation of application No. PCT/JP2016/078150, filed on Sep. 26, 2016.

(30) Foreign Application Priority Data

Sep. 29, 2015 (JP) .................... 2015-192301

(51) Int. Cl.
| | | |
|---|---|---|
| *G02F 1/1335* | (2006.01) | |
| *G02B 1/14* | (2015.01) | |
| *B32B 27/38* | (2006.01) | |
| *B32B 27/30* | (2006.01) | |
| *G02B 5/02* | (2006.01) | |
| *G02B 5/30* | (2006.01) | |
| *B32B 7/02* | (2019.01) | |
| *B32B 27/08* | (2006.01) | |
| *G02F 1/13357* | (2006.01) | |

(52) U.S. Cl.
CPC .......... *G02F 1/133528* (2013.01); *B32B 7/02* (2013.01); *B32B 27/08* (2013.01); *B32B 27/30* (2013.01); *B32B 27/38* (2013.01); *G02B 1/14* (2015.01); *G02B 5/0242* (2013.01); *G02B 5/0278* (2013.01); *G02B 5/0294* (2013.01); *G02B 5/3033* (2013.01); *G02F 1/133602* (2013.01); *B32B 2250/24* (2013.01); *B32B 2307/42* (2013.01); *B32B 2457/202* (2013.01); *Y10T 428/10* (2015.01); *Y10T 428/1036* (2015.01); *Y10T 428/1059* (2015.01); *Y10T 428/1086* (2015.01)

(58) Field of Classification Search
CPC ... G02F 1/133528; G02B 1/14; G02B 5/0278; B32B 27/08; B32B 2457/202; B32B 2307/42; B32B 2250/24; Y10T 428/10; Y10T 428/1086; Y10T 428/1059; Y10T 428/1036
USPC ...... 428/1.1, 1.3, 1.5, 1.6, 413; 349/96, 112, 349/158
See application file for complete search history.

(56) References Cited

U.S. PATENT DOCUMENTS

| | | | |
|---|---|---|---|
| 2010/0129587 A1* | 5/2010 | Terauchi | C08F 220/22 428/65.1 |
| 2012/0171442 A1 | 7/2012 | Yamamoto et al. | |
| 2017/0322345 A1* | 11/2017 | Takada | B32B 27/30 |
| 2019/0202948 A1 | 7/2019 | Sakamoto | |

FOREIGN PATENT DOCUMENTS

| | | |
|---|---|---|
| CN | 101311755 A | 11/2008 |
| CN | 102472856 A | 5/2012 |
| CN | 103582829 A | 2/2014 |
| JP | H0873771 A | 3/1996 |
| JP | H11130981 A | 5/1999 |
| JP | H11148045 A | 6/1999 |
| JP | 2006-124653 A | 5/2006 |
| JP | 2007-046031 A | 2/2007 |
| JP | 2007-237483 A | 9/2007 |
| KR | 10-2010-0018462 A | 2/2010 |
| KR | 10-2013-0133222 A | 12/2013 |
| WO | 2015/025793 A1 | 2/2015 |
| WO | WO-2016125889 A1 * | 8/2016 ............. B32B 27/30 |

OTHER PUBLICATIONS

International Search Report issued in PCT/JP2016/078150 dated Nov. 22, 2016.
Written Opinion issued in PCT/JP2016/078150 dated Nov. 22, 2016.
International Preliminary Report on Patentability completed by WIPO on Apr. 3, 2018, in connection with International Patent Application No. PCT/JP2016/078150.
First Office Action, issued by the State Intellectual Property Office dated Jun. 21, 2019, in connection with Chinese Patent Application No. 201680056866.1.
Office Action, issued by the Korean Intellectual Property Office dated Aug. 6, 2019, in connection with Korean Patent Application No. 10-2018-7008773.
Office Action, issued by the State Intellectual Property Office dated Dec. 17, 2019, in connection with Chinese Patent Application No. 201680056866.1.

* cited by examiner

*Primary Examiner* — Ruiyun Zhang
(74) *Attorney, Agent, or Firm* — Jean C. Edwards, Esq.; Edwards Neils LLC

(57) ABSTRACT

The laminated film includes a substrate film; and a cured layer obtained by curing a polymerizable composition includes a compound having a cyclic ether group, a polyfunctional (meth)acrylate compound having three or more (meth)acryloyl groups in one molecule, a radical polymerization initiator, and a cation polymerization initiator, in which an absorbance ratio P1/P2 in an infrared absorption spectrum of the cured layer is in a range of 4.40 to 15.00, and an absorbance ratio P2/P3 is in a range of 0.01 to 0.08, P1 is an absorbance at an absorption maximum peak in a wave number range of 3,650 to 3,200 $cm^{-1}$, P2 is an absorbance at an absorption maximum peak in a wave number range of 800 to 770 $cm^{-1}$, and P3 is an absorbance at an absorption maximum peak in a wave number range of 1,740 to 1,690 $cm^{-1}$.

13 Claims, No Drawings

LAMINATED FILM, MANUFACTURING METHOD THEREOF, POLARIZING PLATE, LIQUID CRYSTAL PANEL, AND LIQUID CRYSTAL DISPLAY DEVICE

CROSS-REFERENCE TO RELATED APPLICATIONS

This application is a Continuation of PCT International Application No. PCT/JP2016/078150 filed on Sep. 26, 2016, which was published under PCT Article 21(2) in Japanese and claims priority under 35 U.S.C § 119(a) to Japanese Patent Application No. 2015-192301 filed on Sep. 29, 2015. The above applications are hereby expressly incorporated by reference, in their entirety, into the present application.

BACKGROUND OF THE INVENTION

1. Field of the Invention

The present invention relates to a laminated film, a manufacturing method thereof, a polarizing plate, a liquid crystal panel, and a liquid crystal display device.

2. Description of the Related Art

In order to improve the scratch resistance of various articles including a film member included in an image display device such as a liquid crystal display (LCD), forming a cured layer obtained by curing a polymerizable composition (generally, referred to as a hard coat) is widely performed (See, for example, JP2007-237483A, JP1996-073771A (JP-H08-073771A), JP2007-46031A, JP1999-130981A (JP-H11-130981A), and JP1999-148045A (JP-H11-148045A)).

SUMMARY OF THE INVENTION

A laminated film in which a cured layer obtained by curing a polymerizable composition is formed on a substrate film is generally called a hard coat film. Such a laminated film is suitable as, for example, a protective film of a polarizing plate which is a constituent member of a liquid crystal display device, or a front plate which is a member disposed on the viewer side from the display device in the image display device.

However, there is a problem that curling (warping) easily occurs in the laminated film having the cured layer obtained by curing the polymerizable composition. Regarding curling, for example, paragraph 0004 of JP2007-237483A and paragraph 0005 of JP2007-46031A disclose curing shrinkage, that is, shrinkage in a case where the polymerizable composition is cured, becomes a cause of curling.

For example, in an image display device, occurrence of curling in the laminated film can cause deterioration in performance of the image display device due to deformation of a member to which the laminated film is bonded (for example, occurrence of light leakage on a display surface), and thus it is desired to suppress the curling. Meanwhile, in a case where the composition of the polymerizable composition or the curing condition is changed in order to suppress the occurrence of curling, there is a concern in that the surface hardness of the cured layer is lowered, and improvement in scratch resistance by the laminated film may not be sufficiently achieved.

JP2007-237483A, JP1996-073771A (JP-H08-073771A), JP2007-46031A, JP1999-130981A (JP-H11-130981A), and JP1999-148045A (JP-H11-148045A) disclose various proposals for the composition of the polymerizable composition for forming the above cured layer and the method for forming the cured layer. However, as described above, with respect to the laminated film having a cured layer obtained by curing a polymerizable composition on a substrate film, it is not easy to achieve the compatibility between high surface hardness and suppression of curling. Therefore, it is required to provide a laminated film in which these are compatible with each other.

The purpose of the present invention is to provide a laminated film having a cured layer obtained by curing a polymerizable composition on a substrate film, and to provide a laminated film in which surface hardness is high, and occurrence of curling is suppressed.

In order to achieve the above object, the present inventors have intensively conducted research and considered that suppressing the above curing shrinkage was not sufficient for effectively suppressing occurrence of curling of a laminated film having a cured layer obtained by curing a polymerizable composition on a substrate film, and the laminated film was to be suppressed from deforming due to the influence of temperature and humidity (dimensional change), that is, dimensional stability was to be improved. In a case where dimensions of the laminated film easily change, even in a case where curling (hereinafter also referred to as "initial curling") does not occur or hardly occur after curing, for example, after the laminated film is incorporated into an image display device, the laminated film is deformed due to the influence of temperature and humidity such that curling (hereinafter also referred to as "curling after a lapse of time") occurs.

In view of the above, the present inventors have further conducted intensive research so as to obtain a laminated film in which the occurrence of curling due to curing shrinkage and the occurrence of curling due to the above dimensional change are suppressed and which has a high surface hardness to newly find the following laminated film comprising:
a substrate film; and a cured layer obtained by curing a polymerizable composition,
in which the polymerizable composition includes
a compound having a cyclic ether group;
a polyfunctional (meth)acrylate compound having three or more (meth)acryloyl groups in one molecule;
a radical polymerization initiator; and
a cation polymerization initiator,
in which the compound having a cyclic ether group at least includes an alicyclic epoxy compound including one or more alicyclic epoxy groups in one molecule,
in which, in the alicyclic epoxy compound, a value obtained by dividing a molecular weight by the number of alicyclic epoxy groups included in one molecule is in a range of 80 to 250, and a value obtained by dividing the number of cyclic ether groups other than the alicyclic epoxy groups included in one molecule by a molecular weight is in a range of 0 to 0.002,
in which a content of the alicyclic epoxy compound with respect to a total amount of a solid content of the polymerizable composition is in a range of 10.0 to 40.0 mass %,
in which a content of the compound having a cyclic ether group other than the alicyclic epoxy compound of the polymerizable composition is 5.0 mass % or less,
in which an absorbance ratio P1/P2 in an infrared absorption spectrum of the cured layer is in a range of 4.40 to 15.00, and an absorbance ratio P2/P3 is in a range of 0.01 to 0.08, in which P1 is an absorbance at an absorption maximum peak in a wave number range of 3,650 to 3,200 cm$^{-1}$, in which P2 is an absorbance at an absorption maximum peak in a wave number range of 800 to 770 cm$^{-1}$, and in which P3 is an absorbance at an absorption maximum peak in a wave number range of 1,740 to 1,690 cm$^{-1}$.

That is, with respect to the laminated film, the occurrence of initial curling and the occurrence of curling after a lapse of time can be suppressed, and high surface hardness can be exhibited. The assumption by the present inventors on this point is be described below.

In the present invention and the present specification, the "alicyclic epoxy group" refers to a cyclic group having a structure in which an epoxy ring and a saturated hydrocarbon ring are fused, and specific examples thereof are described below.

A "(meth)acryloyl group" means any one or both of an acryloyl group and a methacryloyl group. The expression "(meth)acrylate" means any one or both of acrylate and methacrylate. The same is applied to "(meth)acryl" described below and the like.

A "polymerizable composition" refers to a composition including one or more polymerizable compounds. A "polymerizable compound" refers to a compound having one or more polymerizable groups in one molecule, and a "polymerizable group" refers to a group capable of polymerization reaction (also referred to as curing reaction).

A "total amount of a solid content" of a polymerizable composition means a total amount of all the components except for the solvent in a case where the polymerizable composition contains a solvent, and means a total amount of all the components included in the polymerizable composition in a case where the polymerizable composition does not contain a solvent.

A "molecular weight" refers to a weight-average molecular weight of a polymer. The weight-average molecular weight means a weight-average molecular weight measured by gel permeation chromatography (GPC) in terms of polystyrene. Examples of specific measurement conditions include the following measurement conditions. The weight-average molecular weight described below is a value measured under the following measurement condition.

GPC device: HLC-8120 (manufactured by Tosoh Corporation):

Column: TSKgel SuperHZM-H, TSKgel SuperHZ4000, TSKgel SuperHZ200 (manufactured by Tosoh Corporation)

Eluant: Tetrahydrofuran (THF)

According to an aspect, the polymerizable composition may include a particulate filler having a reactive group reactive with at least one of an alicyclic epoxy group or a (meth)acryloyl group on an inorganic particle surface by 5.0 to 40.0 mass %, with respect to a total amount of a solid content of a polymerizable composition.

According to an aspect, the alicyclic epoxy group included in the alicyclic epoxy compound may include a 3,4-epoxycyclohexyl group.

According to an aspect, the alicyclic epoxy compound may further include one or more (meth)acryloyl groups in one molecule.

According to an aspect, the alicyclic epoxy compound may include 3,4-epoxycyclohexylmethyl (meth)acrylate.

According to an aspect, the substrate film may be a cellulose acylate film having a thickness of 40 µm or less.

According to an aspect, the substrate film may be an acrylic resin film having a thickness of 40 µm or less.

In the present invention and the present specification, an "acrylic resin film" means a film containing an acrylic resin as a constituent component, for example, a film including an acrylic resin as a main component (a component which occupies the most of the film). A mass of an acrylic resin film is set as 100 parts by mass, a ratio of an acrylic resin with respect to this, for example, can be 50 parts by mass or greater, 70 parts by mass or greater, or 90 parts by mass or greater, or, for example, can be 99 parts by mass or less or 95 parts by mass or less. However, the present invention is not limited to these upper and lower limits. An "acrylic resin" refers to a polymer of a derivative of methacrylic acid and/or a derivative of acrylic acid. The derivative is, for example, ester. The "resin" refers to a polymer of two or more polymerizable compounds having the same or different structures and may be a homopolymer or a copolymer.

Another aspect of the present invention relates to a method of manufacturing a laminated film, comprising:

a coating step of coating a substrate film with the polymerizable composition to form a coating film;

a drying step of drying the coating film; and a curing step of curing the coating film after the drying step, in which the curing step includes a first ultraviolet irradiation step of irradiating the coating film having a film surface temperature of 40° C. or lower with ultraviolet rays in an irradiation dose of 30 to 200 mJ/cm$^2$, and a second ultraviolet irradiation step of irradiating the coating film having a film surface temperature of 50° C. or higher with ultraviolet rays in an irradiation dose of 200 mJ/cm$^2$ or greater after the first ultraviolet irradiation step.

According to an aspect, in the method of manufacturing the laminated film, ultraviolet irradiation in the first ultraviolet irradiation step may be performed by selectively blocking light in a wavelength of 280 nm or less included in ultraviolet rays emitted from an ultraviolet light source or by selectively reducing an irradiation dose of light having a wavelength of 280 nm or less included in ultraviolet rays emitted from an ultraviolet light source, and ultraviolet irradiation in the second ultraviolet irradiation step may be performed by irradiation with light having an emission wavelength at least in a wavelength of 200 to 380 nm.

According to an aspect, the selective blocking or the selective reducing of the irradiation dose may be performed by disposing a member that is able to perform the selective blocking or the selective reducing of the irradiation dose between the ultraviolet light source and the coating film.

Still another aspect of the present invention relates to a polarizing plate comprising a polarizer and the laminated film.

Still another aspect of the present invention relates to a liquid crystal panel which includes a front-side polarizing plate, a liquid crystal display element, and a rear-side polarizing plate, and in which the front-side polarizing plate is the polarizing plate.

The "front-side polarizing plate" is a polarizing plate positioned on the viewer side among the two polarizing plates in a case where the liquid crystal panel is incorporated in the liquid crystal display device together with the backlight unit, and the "rear-side polarizing plate" is a polarizing plate positioned on a backlight unit side.

Still another aspect of the present invention relates to a liquid crystal display device including the liquid crystal panel and a backlight unit.

According to one aspect of the present invention, it is possible to provide a laminated film which has high surface hardness and in which all of the occurrence of initial curling and the occurrence of curling after a lapse of time are suppressed and a method of manufacturing this laminated film, and a polarizing plate, a liquid crystal panel, and a liquid crystal display device, each including this laminated film.

DESCRIPTION OF THE PREFERRED EMBODIMENTS

The description below is provided based on typical embodiments of the present invention, but the present invention is not limited to the embodiments. In the present invention and the present specification, a numerical range denoted by using "to" indicates a range including numerical values described before and after "to" as the lower limit value and the upper limit value.

[Laminated Film]

The laminated film according to an aspect of the present invention is a lamination layer film including a substrate film and a cured layer (hereinafter, simply referred to as a "cured layer") obtained by curing a polymerizable composition, in which the polymerizable composition includes a compound having a cyclic ether group;

a polyfunctional (meth)acrylate compound (hereinafter, simply referred to as a "polyfunctional (meth)acrylate compound") having three or more (meth)acryloyl groups in one molecule, a radical polymerization initiator; and a cation polymerization initiator, a compound having the cyclic ether group at least includes an alicyclic epoxy compound including one or more alicyclic epoxy groups in one molecule, in the alicyclic epoxy compound, a value obtained by dividing a molecular weight by the number of alicyclic epoxy groups included in one molecule is in a range of 80 to 250, and a value obtained by dividing the number of cyclic ether groups other than the alicyclic epoxy groups included in one molecule by a molecular weight is in a range of 0 to 0.002, a content of the alicyclic epoxy compound with respect to a total amount of a solid content of the polymerizable composition is in a range of 10.0 to 40.0 mass %, a content of a compound having a cyclic ether group other than the alicyclic epoxy compound of the polymerizable composition is 5.0 mass % or less, an absorbance ratio P1/P2 in an infrared absorption spectrum of the cured layer is in a range of 4.40 to 15.00, and an absorbance ratio P2/P3 is in a range of 0.01 to 0.08, P1 is an absorbance at an absorption maximum peak in a wave number range of 3,650 to 3,200 cm$^{-1}$, P2 is an absorbance at an absorption maximum peak in a wave number range of 800 to 770 cm$^{-1}$, and P3 is an absorbance at an absorption maximum peak in a wave number range of 1,740 to 1,690 cm$^{-1}$.

Hereinafter, unless described otherwise, the "alicyclic epoxy compound" refers to an alicyclic epoxy compound which includes one or more alicyclic epoxy groups in one molecule as described above, and in which a value obtained by dividing a molecular weight by the number of alicyclic epoxy groups included in one molecule is in a range of 80 to 250, and in which a value obtained by dividing the number of cyclic ether groups other than the alicyclic epoxy groups included in one molecule by a molecular weight is in a range of 0 to 0.002.

The following is an assumption of the present inventors and does not limit the present invention at all, but the present inventors consider the reason that the above laminated film can exhibit high surface hardness, and the occurrence of initial curling and the occurrence curling after a lapse of time can be suppressed as follows.

(1) The present inventors assume that the alicyclic epoxy compound contributes to the improvement of the surface hardness, and a polymerizable compound having little curing shrinkage among various polymerizable compounds contributes to suppressing the occurrence of initial curling.

(2) The present inventors assume that a cured layer obtained by curing the polymerizable composition including the above alicyclic epoxy compound which is a cationically polymerizable compound and the polyfunctional (meth) acrylate compound which is a radically polymerizable compound contributes to the improvement of the surface hardness. Specifically, the present inventors assume that entanglement between a polymer formed by polymerization of a radically polymerizable compound and a polymer generated by polymerization of a cationically polymerizable compound contributes to the improvement of surface hardness.

(3) With respect to the absorbance ratio P1/P2 and the absorbance ratio P2/P3, the present inventors consider as follows.

An alicyclic epoxy compound is polymerized by repetition of the ring opening of an alicyclic epoxy group (the generation of a hydroxyl group according to the ring opening) and polymerization reaction, so as to form a polymer (hereinafter, the corresponding reaction is also referred to as a "growth reaction"). The present inventors consider that formation of a polymer by the progress of a growth reaction contributes to improvement of surface hardness and a portion of hydroxyl groups generated by the ring opening of an alicyclic epoxy group that remains without being subjected to a growth reaction and that exists in the laminated film after the polymerization contributes to suppressing the occurrence of curling after a lapse of time. Specifically, the present inventors assume that the hydroxyl group may contribute to suppressing deformation of the cured layer due to changes in temperature and humidity, for example, moisture absorption.

In this regard, the absorption in the infrared spectrum in the wave number range of 800 to 770 cm$^{-1}$ is the absorption derived from the stretching vibration of the cyclic ether group. Therefore, P2, which is the absorbance at the absorption maximum peak in the above wave number range, is proportional to the amount of cyclic ether groups existing in the cured layer, and it is considered that P2 increases as the amount of cyclic ether groups increases. As described later in detail, in the alicyclic epoxy compound, most or all of the cyclic ether groups included in this compound are alicyclic epoxy groups. The polymerizable composition includes the alicyclic epoxy compound in a content of 10.0 to 40.0 mass % with respect to the total amount of the solid content, and the content of the compound including the cyclic ether group other than the alicyclic epoxy compound is 5.0 mass % or less. That is, most or all of the cyclic ether groups included in the polymerizable composition are alicyclic epoxy groups. Therefore, the absorbance P2 is proportional to the amount of the alicyclic epoxy group existing in the cured layer, and it is considered that P2 increases as the amount of an alicyclic epoxy group is increased. The alicyclic epoxy group of the alicyclic epoxy compound ring-opens by the action of the cation polymerization initiator included in the polymerizable composition, and the amount of the alicyclic epoxy group included in the cured layer decreases, as the ring opening occurs.

On the other hand, the absorption in the infrared spectrum in a wave number range of 1,740 to 1,690 cm$^{-1}$ is absorption derived from the C=O stretching vibration of the ester bond. Therefore, P3, which is the absorbance at the absorption maximum peak in the above wave number range, is proportional to the amount of C=O of the ester bond existing in the cured layer, and it is considered that P3 increases as C=O of the ester bond increases. C=O of the ester bond exists before or after the (meth)acryloyl group of the polyfunctional (meth)acrylate compound is subjected to the polymerization reaction. Therefore, it can be said that P3 is a value independent from the degree of polymerization of the polyfunctional (meth)acrylate compound. With respect to P3, the present inventors consider that the absorbance ratio P2/P3 defining P2 which is a value proportional to the amount of an alicyclic epoxy group included in the cured layer becomes an index of the ring opening rate of the alicyclic epoxy group of the alicyclic epoxy compound included in the polymerizable composition.

On the other hand, the absorption in the infrared spectrum at the wave number range of 3,650 to 3,200 cm$^{-1}$ is absorption due to O—H stretching vibration, that is, absorption due to the existence of the hydroxyl group. Therefore, P1, which is the absorbance at the absorption maximum peak in the above wave number range, is proportional to the amount of hydroxyl groups existing in the cured layer, and it is considered that P1 increases as the amount of hydroxyl groups increases. On the other hand, the absorbance ratio P2 is proportional to the amount of alicyclic epoxy group existing in the cured layer as described above, and it is considered that P2 increases as the amount of alicyclic epoxy groups increases. A hydroxyl group is generated by ring-opening of the alicyclic epoxy group, and thus it is considered that the absorbance ratio P1/P2 is an index of the amount of hydroxyl groups derived from the alicyclic epoxy compound existing in the cured layer without being subjected to a growth reaction of the alicyclic epoxy compound which are generated by ring opening of the alicyclic epoxy compound.

From the above, the present inventors assume that, the alicyclic epoxy group of the alicyclic epoxy compound included in the polymerizable composition is ring-opened in an ring opening rate in which the absorbance ratio P2/P3 is in the range of 0.01 to 0.08, a portion of the hydroxyl groups generated by the ring opening is polymerized by being subjected to the growth reaction in a degree in which the absorbance ratio P1/P2 is in the range of 4.40 to 15.00, and some hydroxyl groups are not subjected to the growth reaction to be retained and exist in the cured layer, so as to contribute to improvement of the surface hardness and suppressing of the occurrence of curling after a lapse of time.

However, the above is merely a guess, and does not limit the present invention at all. The descriptions below also include assumptions by the present inventors, but the descriptions are merely an estimate and do not limit the present invention at all.

Hereinafter, the laminated film is further described in detail.

<Polymerizable Composition>

<<Alicyclic Epoxy Compound>>

The laminated film has a cured layer obtained by curing the polymerizable composition on the substrate film. The polymerizable composition includes at least an alicyclic epoxy compound including one or more alicyclic epoxy groups in one molecule, the alicyclic epoxy compound is a value obtained by dividing a molecular weight by the number of alicyclic epoxy groups included in one molecule (molecular weight/the number of alicyclic epoxy groups included in one molecule; hereinafter referred to as an "A value") is in a range of 80 to 250, and a value obtained by dividing the number of cyclic ether groups other than the alicyclic epoxy group included in one molecule by the molecular weight (the number of cyclic ether groups other than alicyclic epoxy group included in one molecule/molecular weight; hereinafter, referred to as a "B value") is in a range of 0 to 0.002.

(A Value and B Value)

The A value is a value obtained by dividing a molecular weight by the number of alicyclic epoxy groups included in one molecule, and a smaller value means a higher proportion of the alicyclic epoxy group in the alicyclic epoxy compound. The present inventors assume that the alicyclic epoxy compound including an alicyclic epoxy group to a degree in which the A value is 250 or less contributes to improvement of the surface hardness of the cured layer and improvement of the surface hardness of the laminated film accordingly. In view of further improving the surface hardness, the A value is preferably 230 or less and more preferably 200 or less. In the case of a compound including at least one alicyclic epoxy group in one molecule, the A value is generally 80 or greater. Therefore, the fact that the A value is 80 or greater can be regarded as synonymous with the existence of the alicyclic epoxy group in the compound. The alicyclic epoxy group included in the alicyclic epoxy compound may be used singly or two or more kinds thereof having different structures may be used.

Meanwhile, the B value is a value obtained by dividing the number of cyclic ether groups other than the alicyclic epoxy group included in one molecule by the molecular weight, and the B value in the range of 0 to 0.002 means that most or all of the cyclic ether groups included in the alicyclic epoxy compound are alicyclic epoxy groups.

(Alicyclic Epoxy Group)

As described above, the alicyclic epoxy group included in the alicyclic epoxy compound refers to a cyclic group having a structure in which an epoxy ring and a saturated hydrocarbon ring are fused, is preferably a cyclic group having a condensed ring of an epoxy ring and a cycloalkane ring, and is more preferably a 3,4-epoxycyclohexyl group. The alicyclic epoxy group may be unsubstituted or may have one or more substituents. Examples of the substituent include an alkyl group (for example, an alkyl group having 1 to 6 carbon atoms), an alkoxy group (for example, an alkoxy group having 1 to 6 carbon atoms), a halogen atom (such as a fluorine atom, a chlorine atom, and a bromine atom), a cyano group, an amino group, a nitro group, an acyl group, and a carboxyl group. In the same manner, each group described in the present specification may be unsubstituted or may have one or more substituents. Examples of the substituent are as described above. It is preferable that the alicyclic epoxy group is unsubstituted. In a case where the alicyclic epoxy compound has an A value and a B value in the above range, the alicyclic epoxy compound may be a monofunctional alicyclic epoxy compound having one alicyclic epoxy group included in one molecule or may be a polyfunctional alicyclic epoxy compound having two or more alicyclic epoxy groups included in one molecule. The alicyclic epoxy compound may be a monomer or a polymer.

The alicyclic epoxy group is a cationically polymerizable group, but the alicyclic epoxy compound may have one or more radically polymerizable groups in addition to the alicyclic epoxy group. As such a radically polymerizable group, a (meth)acryloyl group is preferable. The alicyclic epoxy compound having a (meth)acryloyl group can be reacted (crosslinked) with the polyfunctional (meth)acrylate compound included in the polymerizable composition, and this reaction makes it possible to form a cured layer having higher surface hardness.

Among the compounds described in the present invention and the present specification, a compound having a (meth)acryloyl group may include a (meth)acryloyl group in a structure ((meth)acryloyloxy group) in which an oxygen molecule is linked to a (meth)acryloyl group and preferably includes a (meth)acryloyl group in such a structure. In a case where the alicyclic epoxy compound has a (meth)acryloyl group, the number of (meth)acryloyl groups included in one molecule is, for example, 1 to 3 and preferably 1.

One preferred aspect of the alicyclic epoxy compound include a compound represented by Formula (1) having one alicyclic epoxy group (3,4-epoxycyclohexyl group) in one molecule and one (meth)acryloyl group ((meth)acryloyloxy group) in one molecule. The compound represented by Formula (1) is preferably a compound represented by Formula (1A).

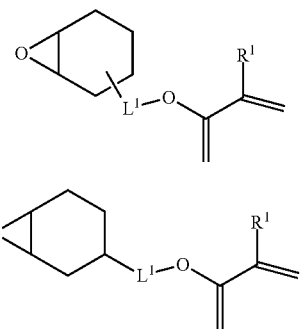

Formula (1)

Formula (1A)

In Formulae (1) and (1A), $R^1$ represents a hydrogen atom or a methyl group, $L^1$ represents a divalent aliphatic hydrocarbon group having 1 to 3 carbon atoms, preferably represents an alkylene group having 1 to 3 carbon atoms, and more preferably represents a methylene group. The compound represented by Formula (1) is preferably a compound represented by Formula (1A), more preferably 3,4-epoxy-cyclohexylmethyl (meth)acrylate, and even more preferably 3,4-epoxycyclohexylmethyl methacrylate.

In the case where the alicyclic epoxy compound is a polymer, a preferable aspect of the repeating unit of the polymer includes a repeating unit represented by the Formula (2). The alicyclic epoxy compound may be a polymer including only one type of repeating unit, that is, a homopolymer, and may be a polymer including two or more types of repeating units, that is, a copolymer.

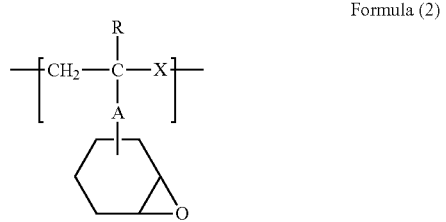

Formula (2)

In Formula (2), X represents a single bond or the following linking group: an oxygen atom, an alkylene group, an arylene group, an aralkylene group, an ester bond, an ether bond, a carbonyl bond, —NH—, or a linking group formed by combining two or more of the above linking groups.

In a case where X represents an alkylene group, the alkylene group may be any one of linear, branched or cyclic alkylene groups. The alkylene group is preferably an alkylene group having 1 to 6 carbon atoms and more preferably an alkylene group having 1 to 3 carbon atoms. Specifically, the alkylene group is preferably a methylene group, an ethylene group, a propylene group, or a cyclohexylene group.

In a case where X represents an arylene group, the arylene group is preferably an arylene group having 6 to 18 carbon atoms and more preferably an arylene group having 6 to 12 carbon atoms. Specifically, the arylene group is preferably a phenylene group or a naphthylene group.

In a case where X represents an aralkylene group, the aralkylene group is preferably an aralkylene group having 7 to 19 carbon atoms and more preferably an aralkylene group having 7 to 13 carbon atoms. X may be a linking group obtained by combining the above linking groups, and examples of the linking group obtained by the combination include a linking group obtained by combining an ester bond and an alkylene group, a linking group obtained by combining an arylene group, an ester bond, and an alkylene group, a linking group obtained by combining an alkylene group and an ether bond, and a linking group obtained by combining a carbonyl bond, —NH—, an alkylene group, and an ether bond.

As X, a single bond is most preferable.

In Formula (2), A represents a single bond or the following linking group: an alkylene group, an arylene group, an aralkylene group that may have a substituent, an ester bond, an ether bond, a carbonyl bond, —NH—, or a linking group formed by combining two or more of the above linking groups.

In a case where A represents an alkylene group, the alkylene group may be any one of linear, branched or cyclic alkylene groups. The alkylene group is preferably an alkylene group having 1 to 6 carbon atoms and more preferably an alkylene group having 1 to 3 carbon atoms. Specifically, the alkylene group is preferably a methylene group, an ethylene group, a propylene group, or a cyclohexylene group.

In a case where A represents an arylene group, the arylene group is preferably an arylene group having 6 to 18 carbon atoms and more preferably an arylene group having 6 to 12 carbon atoms. Specifically, the arylene group is preferably a phenylene group or a naphthylene group.

In a case where A represents an aralkylene group, the aralkylene group is preferably an aralkylene group having 7 to 19 carbon atoms and more preferably an aralkylene group having 7 to 13 carbon atoms. A may be a linking group obtained by combining the above linking groups, and examples of the linking group obtained by the combination include a linking group obtained by combining an ester bond and an alkylene group, a linking group obtained by combining an arylene group, an ester bond, and an alkylene group, a linking group obtained by combining an alkylene group and an ether bond, and a linking group obtained by combining a carbonyl bond, —NH—, an alkylene group, and an ether bond.

A is preferably an ester bond, an ether bond, —CONH—, an alkylene group, an arylene group, or a linking group formed by combining these.

R represents a hydrogen atom or a methyl group.

Specific examples of the repeating unit represented by Formula (2) are provided below, but the alicyclic epoxy compound is not limited to compounds having these.

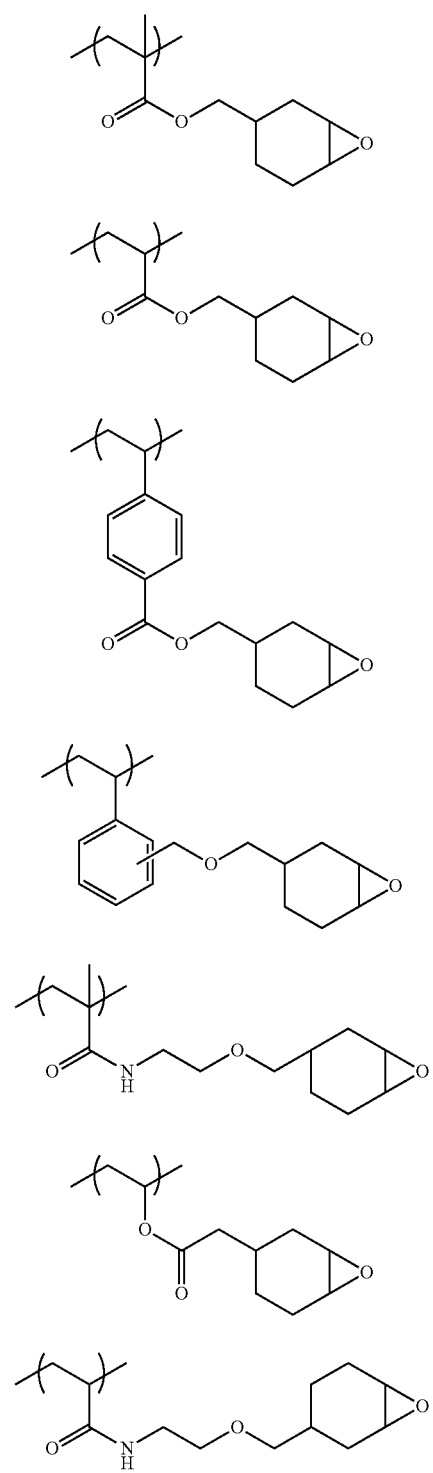

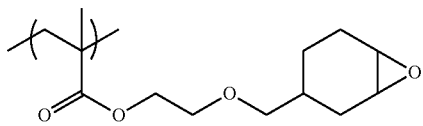

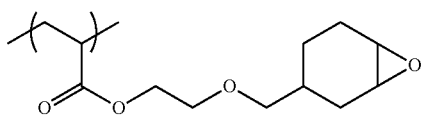

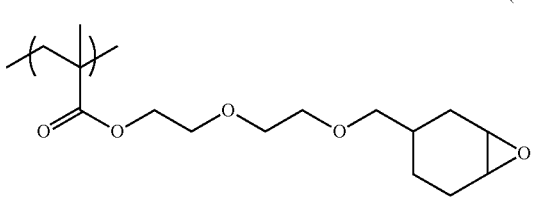

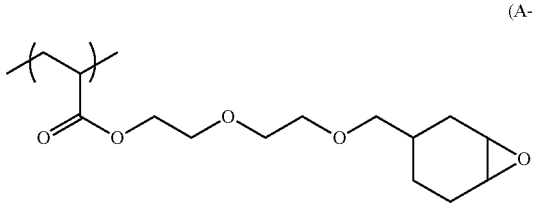

Specific examples of the polyfunctional alicyclic epoxy compound include Compounds 2a to 2c. However, the alicyclic epoxy compound is not limited to the following specific examples. The expression "polyfunctional" with respect to the alicyclic epoxy compound means that the number of alicyclic epoxy groups included in one molecule is two or more, for example, the expression "difunctional" means that the number is two, and the expression "trifunctional" means that the number is three.

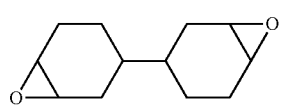

Compound 2a

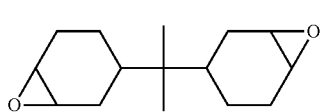

Compound 2b

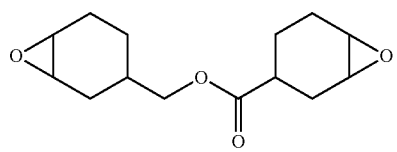

Compound 2c

The molecular weight of the alicyclic epoxy compound with respect to the monomer, for example, can be in the range of 100 to 500, and the weight-average molecular weight with respect to the polymer can be in the range of 1,000 to 100,000. However, the molecular weight may be the A value and the B value described above, and the molecular weight is not limited to the above range.

(Content of Alicyclic Epoxy Compound in Polymerizable Composition, and Content of Compound Having Cyclic Ether Group Other than Alicyclic Epoxy Compound)

The polymerizable composition includes a compound including a cyclic ether group, and examples of the cyclic ether compound include the alicyclic epoxy compound described above by 10.0 to 40.0 mass % with respect to the total amount (100.0 mass %) of the solid content of the polymerizable composition. Here, a content of a compound having a cyclic ether group other than the alicyclic epoxy compound included in the polymerizable composition is 5.0 mass % or less. In this manner, most or all of the compounds having a cyclic ether group included therein are the above alicyclic epoxy compounds, the laminated film having, on a substrate film, a cured layer formed by polymerizing the polymerizable composition including the alicyclic epoxy compound in a content of 10.0 to 40.0 mass % such that the absorbance ratio P1/P2 is in the range of 4.40 to 15.00, and the absorbance ratio P2/P3 is in the range of 0.01 to 0.08, can exhibit high surface hardness, and also can suppress the occurrence of initial curling and the occurrence of curling after a lapse of time. This point was found for the first time as a result of intensive research by the present inventors. In view of further improving the surface hardness and further suppressing curing shrinkage, the content of the alicyclic epoxy compound in the polymerizable composition is preferably 15.0 to 35.0 mass % and more preferably in the range of 18.0 to 30.0 mass %. The content of the compound having a cyclic ether group other than the alicyclic epoxy compound is preferably 3.0 mass % or less, more preferably 1.0 mass % or less, and may be 0 mass %.

Unless described otherwise, the described content of a component included in the polymerizable composition is a value with respect to the total amount of the solid content (100.0 mass %) of the polymerizable composition. One component may be contained in the polymerizable composition singly or two or more different structures may be contained. In a case where two or more kinds are included, the content refers to the sum of these. The same is applied to the content of each component included various compositions, films and the like in the present invention and the present specification.

In a case where the polymerizable composition includes a compound having a cyclic ether group other than the alicyclic epoxy compound, examples of the compound having a cyclic ether group other than the alicyclic epoxy compound include an aliphatic epoxy compound such as an epoxy compound having an oxetane group, a glycidyl group, or the like, but the present invention is not particularly limited thereto.

<<Polyfunctional (meth)acrylate Compound>>

The polyfunctional (meth)acrylate compound included in the polymerizable composition together with the alicyclic epoxy compound described above includes three or more (meth)acryloyl groups in one molecule. In a case where the laminated film includes a cured layer formed from a polymerizable composition including such a polyfunctional, that is, a trifunctional or higher functional (meth)acrylate compound as a polymerizable compound, the laminated film can exhibit high surface hardness. The expression "polyfunctional" with respect to the (meth)acrylate compound means that the number of (meth)acryloyl groups included in one molecule is two or more, for example, the expression "difunctional" means that the number is two, and the expression "trifunctional" means that the number is three. The number of (meth)acryloyl groups of the polyfunctional (meth)acrylate compound included in one molecule is 3 or greater, and is preferably in the range of 4 to 6. The (meth)acryloyl group included in the polyfunctional (meth)acrylate compound may be only an acryloyl group or a methacryloyl group, and may be both an acryloyl group and a methacryloyl group. The (meth)acryloyl group can be included in the polyfunctional (meth)acrylate compound as a (meth)acryloyloxy group, and is preferably included as a (meth)acryloyloxy group.

As the polyfunctional (meth)acrylate compound, various polyfunctional acrylate compounds widely used in the industry can be used. Examples thereof include ester of polyhydric alcohol and (meth)acrylic acid {for example, pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, and 1,2,3-cyclohexane tetramethacrylate}, polyurethane polyacrylate, polyester polyacrylate, and caprolactone-modified tris(acryloxyethyl) isocyanurate.

Specific examples of the commercially available products of the polyfunctional (meth)acrylate compound include esterification products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, KAYARAD GPO-303 manufactured by Nippon Kayaku Co., Ltd., and V #400 and V #36095D manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by Nippon Synthetic Chem Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4358 (manufactured by Daicel-UCB Corporation), HIGH-COAP AU-2010 and UNIDIC AU-2020 (manufactured by Tokushiki Co., Ltd.), ARONIX M-1960 (manufactured by Toagosei Co., Ltd.), and ARTRESIN UN-3320HA, UN-3320HC, UN-3320HS, UN-904, and HDP-4T, and a trifunctional or higher functional polyester compound such as ARONIX M-8100, M-8030, and M-9050 (manufactured by Toagosei Co., Ltd.), and KBM-8307 (manufactured by Daicel Cytec Co., Ltd.) can be suitably used.

In view of further improvement of the surface hardness of the laminated film, the content of the polyfunctional (meth)acrylate compound in the polymerizable composition is preferably in the range of 41.0 to 89.4 mass % and more preferably in the range of 51.0 to 70.0 mass %, with respect to the total amount of the solid content (100.0 mass %) of the polymerizable composition.

<<Radical Polymerization Initiator, Cation Polymerization Initiator>>

The alicyclic epoxy compound included in the polymerizable composition is a cationically polymerizable compound, and the polyfunctional (meth)acrylate compound is a radically polymerizable compound. In order to initiate the polymerization reaction of these polymerizable compounds with different polymerization types, the polymerizable composition includes a radical polymerization initiator and a cation polymerization initiator.

The radical polymerization initiator and the cation polymerization initiator may be a photopolymerization initiator or may be a thermal polymerization initiator.

As the radical polymerization initiator, various polymerization initiators disclosed in "The Latest UV Curing Technique" (p. 159; Publisher: Kazuhiro Takausu; Publishing company: Technical Information Institute Co. Ltd.; published in 1991) or commercially available products disclosed in a catalog of BASF SE can be used. As specific examples of commercially available products of the radical polymerization initiators, alkylphenone-based photopolymerization initiators (Irgacure651, Irgacure184, DAROCURE1173, Irgacure2959, Irgacure127, DAROCURE MBF, Irgacure907, Irgacure369, and Irgacure379EG manufactured by BASF SE), an acylphosphine oxide-based photopolymerization initiator (Irgacure819 and LUCIRIN TPO manufactured by BASF SE), and others (Irgacure784, Irgacure OXE01, Irgacure OXE02, and Irgacure754 manufactured by BASF SE) can be used.

Examples of the cation polymerization initiator include well-known compounds such as photoinitiators for photocationic polymerization, photo-decoloring agents for coloring agents, photo-discoloring agents, or well-known acid generators used for microresists and the like, and mixtures thereof.

Examples thereof include an onium salt compound, an organic halogen compound, and a disulfone compound.

Examples of the onium salt compound include a diazonium salt compound, an ammonium salt compound, an iminium salt compound, a phosphonium salt compound, an iodonium salt compound, a sulfonium salt compound, an arsonium salt compound, and a selenonium salt compound, and examples thereof include compounds disclosed in paragraphs 0058 and 0059 disclosed in JP2002-29162A.

Examples of the particularly suitably used cation polymerization initiator include an onium salt compound, and a diazonium salt compound, an iodonium salt compound, a sulfonium salt compound, and an iminium salt compound are preferable in view of photosensitivity of photopolymerization initiation, the material stability of the compound and the like. Among these, an iodonium salt compound is most preferable in view of light fastness.

Specific examples of onium salt compounds that can be suitably used include an amylated sulfonium salt compound disclosed in paragraph 0035 of JP1997-268205A (JP-H9-268205A), a diaryliodonium salt compound or a triarylsulfonium salt compound disclosed in paragraphs 0010 and 0011 of JP2000-71366A, a sulfonium salt compound of thiobenzoic acid S-phenyl ester disclosed in paragraph 0017 of JP2001-288205A, and an onium salt compound disclosed in paragraphs 0030 to 0033 of JP2001-133696A.

The other examples of the cation polymerization initiator include compounds such as organometallic/organic halide, a photoacid generator having an o-nitrobenzyl type protecting group, and a compound that is photolyzed to generate sulfonic acid (such as iminosulfonate) disclosed in paragraphs 0059 to 0062 of JP2002-29162A.

Specific examples of commercially available products of iodonium salt-based cation polymerization initiators include B2380 (manufactured by Tokyo Chemical Industry Co., Ltd.), BBI-102 (manufactured by Midori Kagaku Co., Ltd.), WPI-113 (manufactured by Wako Pure Chemical Industries, Inc.), WPI-124 (manufactured by Wako Pure Chemical Industries, Inc.), WPI-169 (manufactured by Wako Pure Chemical Industries, Inc.), WPI-170 (manufactured by Wako Pure Chemical Industries, Inc.), and DTBPI-PFBS (manufactured by Toyo Gosei Co., Ltd.).

As a preferable combination of the radical polymerization initiator and the cation polymerization initiator included in the polymerizable composition, in a case where both of the radical polymerization initiator and the cation polymerization initiator are photopolymerization initiators that initiate polymerization upon irradiation with ultraviolet rays, it is preferable that a radical polymerization initiator and a cation polymerization initiator having different maximum absorption wavelengths $\lambda$max are combined to be used. It is assumed that in a case where the radical polymerization initiator and a cation polymerization initiator in this combination are used, the polymerization reaction of the alicyclic epoxy compound can be initiated independently (or in a state with little influence) from the polymerization reaction of the polyfunctional (meth)acrylate compound which is a radically polymerizable compound, and thus the control of the absorbance ratio P1/P2 or P2/P3 becomes easier. Specifically, for example, a combination of a radical polymerization initiator having the maximum absorption wavelength $\lambda$max of 270 nm or less and a cation polymerization initiator having the maximum absorption wavelength $\Delta$max greater than 270 nm is preferable.

The above maximum absorption wavelength $\lambda$max can be measured by using a solution obtained by dissolving a compound used as a polymerization initiator in dichloromethane, for example, at a concentration of 0.005 mass % as a measurement sample with an ultraviolet-visible-near infrared spectrophotometer. In this case, the concentration of the compound in the sample for measurement can be suitably selected in the range where measurement sensitivity can be obtained.

The "ultraviolet rays" in the present invention and the present specification refers to light having a wavelength of from 190 to 400 nm.

In view of satisfactorily progressing the polymerization reaction of the radically polymerizable compound included in the polymerizable composition, the content of the radical polymerization initiator in the polymerizable composition is preferably in the range of 0.1 to 10.0 mass %, more preferably in the range of 1.0 to 5.0 mass %, and even more preferably in the range of 2.0 to 4.0 mass % with respect to the total amount of the solid content (100 mass %) of the polymerizable composition. In a case where the alicyclic epoxy compound includes a radically polymerizable group as described above, the polymerization reaction of the radically polymerizable group can be initiated by the action of the radical polymerization initiator so as to progress.

In view of satisfactorily progressing the polymerization reaction of the cationically polymerizable compound (such as the alicyclic epoxy compound) included in the polymerizable composition and the stability of the polymerizable composition, the content of the cation polymerization initiator in the polymerizable composition is preferably in the range of 0.1 to 10.0 mass % and more preferably in the range of 0.5 to 3.0 mass % with respect to the total amount of the solid content (100 mass %) of the polymerizable composition.

The radical polymerization initiator and the cation polymerization initiator may be used singly or two or more kinds thereof may be used in combination.

<<Optional Component>>

In addition to the above-described various components, the polymerizable composition may contain one or more optional components. Specific examples of optional components are described below, but optional components that can be included in the polymerizable composition are not limited to the following specific examples, and in general, one or more well-known additives that can be added to a cured layer called a hard coat may be included in an arbitrary amount.

(Particulate Filler)

One of the specific examples of the optional component is a particulate filler. In view of suppressing curing shrinkage, it is preferable to form a cured layer by curing the polymerizable composition including the particulate filler.

Examples of the inorganic particles include silica particles, titanium dioxide particles, zirconium oxide particles, and aluminum oxide particles. Among these, silica particles are preferable.

Generally, the inorganic particles tend to have a low affinity with the organic component (for example, the polymerizable compound) included in the polymerizable composition. In order to increase the affinity, it is preferable to treat the surface of the inorganic particle with a surface modifying agent including an organic segment.

The surface modifying agent preferably has a functional group that can form a bond with the inorganic particle or adsorb to the inorganic particle and a functional group having high affinity with the organic component included in the polymerizable composition in the same molecule. The surface modifying agent having a functional group that can form a bond with the inorganic particle or adsorb to the inorganic particle is preferably a metal alkoxide surface modifying agent such as silane, aluminum, titanium, and zirconium, and a surface modifying agent having an anionic group such as a phosphoric acid group, a sulfuric acid group, a sulfonic acid group, and a carboxylic acid group. The functional group having high affinity with the organic component may be simply a functional group that has hydrophilic and hydrophobic properties compatible with the organic component but is preferably a functional group that can be chemically bonded to the organic component. At this point, it is preferable to use a particulate filler having a reactive group reactive with at least one of an alicyclic epoxy group or a (meth)acryloyl group on an inorganic particle surface as the particulate filler. It is considered that the reactive group included in the particulate filler reacts with the polymerizable group (alicyclic epoxy group and/or (meth)acryloyl group) included in the polymerizable compound described above, such that the crosslinking density in the cured layer increases, and this contributes to the further improvement of the surface hardness.

Representative examples of the surface modifying agent include an unsaturated double bond-containing coupling agent, a phosphoric acid group-containing organic polymerizable compound, a sulfuric acid group-containing organic polymerizable compound, and a carboxylic acid group-containing organic polymerizable compound.

S-1 $H_2C=C(X)COOC_3H_6Si(OCH_3)_3$
S-2 $H_2C=C(X)COOC_2H_4OTi(OC_2H)_3$
S-3 $H_2C=C(X)COOC_2H_4OCOC_5H_{10}OPO(OH)_2$
S-4 $(H_2C=C(X)COOC_2H_4OCOC_5H_{10}O)_2POOH$
S-5 $H_2C=C(X)COOC_2H_4OSO_3H$
S-6 $H_2C=C(X)COO(C_5H_{10}COO)_2H$
S-7 $H_2C=C(X)COOC_5H_{10}COOH$
S-8 $CH_2CH(O)CH_2OC_3H_6Si(OCH_3)_3$ (X represents a hydrogen atom or a methyl group ($CH_3$))

The surface modification of the inorganic particles with the surface modifying agent is preferably performed in a solution. In a case where the inorganic particles are finely dispersed mechanically, a method of causing the surface modifying agent to exist together, a method of adding and stirring the surface modifying agent after the inorganic particles are finely dispersed, or a method of performing surface modification before the inorganic particles are finely dispersed (heating or pH change is performed after heating and drying, if necessary) and finely dispersing the inorganic particles. As a solution in which the surface modifying agent is dissolved, an organic solvent having large polarity is preferable. Specific examples thereof include well-known solvents such as alcohol, ketone, and ester. The particulate filler which is surface-modified with inorganic particles can also be obtained as a commercially available product.

In view of further improving the surface hardness, the average particle diameter of the particulate filler is preferably 10 nm or greater. In view of transparency of the cured layer, the average particle diameter of the particulate filler is preferably 100 nm or less and more preferably 60 nm or less.

The average particle diameter of the particulate filler is an average primary particle diameter, and the average particle diameter can be obtained by obtaining a cross section TEM photograph of the cured layer by a transmission electron microscope (TEM), measuring a grain diameter of each particle included in the cross section TEM photograph, and calculating an average value thereof or can be obtained by causing the particulate filler as a solvent dispersion sol and obtaining a 50% average particle diameter in this sol. The 50% average particle diameter can be obtained using, for example, Nanotrac manufactured by Nikkiso Co., Ltd. or a particle size analyzer.

The shape of the particulate filler is not particularly limited, and may be spherical or non-spherical (irregular). The grain diameter of the irregular particulate filler refers to an average value of the major axis length and minor axis length of the particulate filler. For example, the present inventors assume that the fact that several (for example, two to ten) particulate fillers in the cured layer are included in a state of being connected in a chain form contributes to further improvement in surface hardness due to formation of a strong particle network structure.

In view of further improvement of the surface hardness, the content of the particulate filler in the polymerizable composition is preferably in the range of 5.0 to 40.0 mass % and is more preferably in the range of 10.0 to 30.0 mass % with respect to the total amount of the solid content (100.0 mass %) of the polymerizable composition.

Specific examples of commercially available products of particulate fillers include ELECOM V-8802 (spherical silica particles having an average particle diameter of 12 nm manufactured by JGC Corporation) or ELECOM V-8803 (irregular silica particles manufactured by JGC Corporation), MiBK-SD (spherical silica particles having an average particle diameter of 10 to 20 nm manufactured by Nissan Chemical Industries, Ltd.), MEK-AC-2140Z (spherical silica particles having an average particle diameter of 10 to 15 nm manufactured by Nissan Chemical Industries, Ltd.), MEK-AC-4130 (spherical silica particles having an average particle diameter of 40 to 50 nm manufactured by Nissan Chemical Industries, Ltd.), MiBK-SD-L (spherical silica particles having an average particle diameter of 40 to 50 nm manufactured by Nissan Chemical Industries, Ltd.), and MEK-AC-5140Z (spherical silica particles having an average particle diameter of 70 to 100 nm manufactured by Nissan Chemical Industries, Ltd.).

Examples of the particulate filler include particles that can provide anti-blocking properties to the cured layer as a so-called matte agent. Hereinafter, the particulate filler is referred to as a matte agent particle. The adding amount of the matte agent particles is preferably 0.1 mass % to 5.0 mass % with respect to the total amount of the solid content (100.0 mass %) of the polymerizable composition.

As the matte agent particles, organic resin particles and inorganic particles can be used. Specific examples thereof include silicon dioxide, calcium carbonate, magnesium carbonate, barium sulfate, aluminum oxide, zirconium oxide, titanium dioxide, polystyrene, a polystyrene-divinylbenzene copolymer, polymethyl methacrylate, crosslinked polymethyl methacrylate, a styrene-acrylic copolymer, melamine, and benzoguanamine. These particles may be contained in the polymerizable composition in an aggregated state.

The organic resin particles are preferably crosslinked polymethyl methacrylate and a styrene-acrylic copolymer and the inorganic particles are preferably silicon dioxide particles.

The average particle diameter (average primary particle diameter) of the matte agent particles is preferably 10 nm to 1,000 nm. In a case where matte agent particles having an average particle diameter of 50 nm or less are used, the matte agent particles are preferably used in an aggregated state.

Specific examples of commercially available products of the matte agent particles include EPOSTAR MA MX-50W, MX-100W, and MX-200W (crosslinked polymethyl methacrylate manufactured by Nippon Shokubai Co., Ltd.), TECHNOPOLYMER XX-242S and XX240S (crosslinked polymethyl methacrylate manufactured by Sekisui Plastics Co., Ltd.), Chemisnow MP-1451, MP-2200, MP-1000, MP-2701, MP-5000, MP-5500, and MP-1600 (crosslinked polymethyl methacrylate manufactured by Soken Chemical & Engineering Co., Ltd.), ORGANOSILICA SOL MEK-ST-2040 (silica sol manufactured by Nissan Chemical Industries, Ltd.), SEAHOSTAR KE-P10, KE-P15, KE-P20, KE-P30, KE-P50, KE-P100, KE-S10, KE-S20, KE-S30, KE-S50, and KE-S100 (silica particles manufactured by Nippon Shokubai Co., Ltd.), QUARTRON PL-3 (aggregated silica manufactured by Fuso Chemical Co., Ltd.), AEROSIL R972, R972V, NX-90, RX-50, R974, R812, 200, 200V, 300, R202, OX50, and TT600 (fumed silica manufactured by Nippon Aerosil Co., Ltd.), and AEROSIL R976 and R811 (zirconium oxide manufactured by Nippon Aerosil Co., Ltd.).

(Solvent)

The polymerizable composition may contain a solvent. The solvent is preferably selected from known various solvents to be used, in view of solubility or dispersibility of respective components, easiness of forming a uniform planar coating film in a coating step and a drying step, satisfactory liquid preservability, and suitable saturated vapor pressure.

As a solvent, a mixed solvent obtained by mixing two or more solvents can be used. In view of drying load, it is preferable that the mixed solvent includes a solvent having a boiling point of 100° C. or lower as a main component and includes a solvent having a boiling point higher than 100° C. for adjusting the drying rate. The main component means a solvent that occupies the largest amount in the mixed solvent. For example, with respect to a solvent total amount (100.0 mass %), a solvent as a main component is preferably contained by 30.0 to 80.0 mass % and more preferably contained by 50.0 to 70.0 mass %. The boiling point means the boiling point at normal pressure and room temperature (101.33 kPa, 25° C.).

Examples of the solvent having a boiling point of 100° C. or lower include hydrocarbons such as hexane (boiling point 68.7° C.), heptane (98.4° C.), cyclohexane (80.7° C.), and benzene (80.1° C.), halogenated hydrocarbons such as dichloromethane (39.8° C.), chloroform (61.2° C.), carbon tetrachloride (76.8° C.), 1,2-dichloroethane (83.5° C.), and trichlorethylene (87.2° C.), ethers such as diethyl ether (34.6° C.), diisopropyl ether (68.5° C.), dipropyl ether (90.5° C.), and tetrahydrofuran (66° C.), esters such as ethyl formate (54.2° C.), methyl acetate (57.8° C.), ethyl acetate (77.1° C.), and isopropyl acetate (89.0° C.), ketones such as acetone (56.1° C.) and 2-butanone (also referred to as methyl ethyl ketone, 79.6° C.), alcohols such as methanol (64.5° C.), ethanol (78.3° C.), 2-propanol (82.4° C.), and 1-propanol (97.2° C.), cyano compounds such as acetonitrile (81.6° C.) and propionitrile (97.4° C.), and carbon disulfide (46.2° C.). Among these, ketones and esters are preferable, and ketones are particularly preferable. Among ketones, 2-butanone is particularly preferable.

Examples of the solvent having a boiling point higher than 100° C. include octane (125.7° C.), toluene (110.6° C.), xylene (138.0° C.), tetrachlorethylene (121.2° C.), chlorobenzene (131.7° C.), dioxane (101.3° C.), dibutyl ether (142.4° C.), isobutyl acetate (118.0° C.), cyclohexanone (155.7° C.), 2-methyl-4-pentanone (also referred to as MIBK (methyl isobutyl ketone), 115.9° C.) 1-butanol (117.7° C.), N,N-dimethylformamide (153.0° C.), N,N-dimethylacetamide (166.0° C.), and dimethyl sulfoxide (189.0° C.). Cyclohexanone and 2-methyl-4-pentanone are preferable. The polymerizable composition preferably contains the solvent having a boiling point higher than 100° C. by 10.0 to 60.0 mass % with respect to a solvent total amount (100.0 mass %).

The concentration of solid content of the polymerizable composition, for example, is 30.0 to 70.0 mass %, but the present invention is not limited thereto.

(Surfactant)

The polymerizable composition may include a surfactant. As the surfactant, one or more well-known surfactants such as a fluorine-based surfactant and a silicone-based surfactant can be used. Among these, a fluorine-based surfactant is preferable because an effect of effectively suppressing the occurrence of coating unevenness, drying unevenness, and the like is excellent. For the details of the fluorine-based surfactant to be preferably used, paragraphs 0064 to 0072 of JP2015-004979A can be referred to. The content of the surfactant in the polymerizable composition is not particularly limited, and a suitable amount of a surfactant may be contained in the polymerizable composition such that occurrence of coating unevenness, drying unevenness, and the like can be suppressed.

<Substrate Film>

The laminated film according to an aspect of the present invention has a cured layer obtained by curing the polymerizable composition on the substrate film. As the substrate film, a resin film excellent in optical performance, transparency, mechanical strength, heat stability, isotropy, and the like is preferable, and a transparent resin film is more preferable. The expression "transparent" in the present invention and the present specification means that the transmittance of visible light is 60% or greater, preferably 80% or greater, and more preferably 90% or greater.

Examples of the resin included in the resin film include a polycarbonate resin, a polyester resin such as polyethylene terephthalate and polyethylene naphthalate, a (meth)acrylic resin such as polymethyl methacrylate, and a styrene resin such as polystyrene and an acrylonitrile-styrene copolymer (acrylonitrile-styrene (AS) resin). Examples thereof include polyolefin such as polyethylene and polypropylene, a polyolefin resin such as an ethylene-propylene copolymer, a vinyl chloride resin, an amide resin such as nylon and aromatic polyamide, an imide resin, a sulfone resin, a polyethersulfone resin, a polyether ether ketone resin, a polyphenylene sulfide resin, a vinylidene chloride resin, a vinyl butyral resin, an allylate resin, a polyoxymethylene resin, an epoxy resin, and a resin obtained by mixing the above resins. The substrate film may be a film obtained by laminating two or more layers of the resin films.

The substrate film is preferably a cellulose resin film represented by triacetyl cellulose which is widely used as a protective film of a polarizing plate and more preferably a cellulose acylate film. As a substrate film, an acrylic resin film which has recently been proposed to be used as a protective film of a polarizing plate can also be preferably used.

The thickness (total thickness in a case where the substrate film is a film obtained by laminating two or more layers of resin films) of the substrate film, for example, can be about 10 μm to 1000 μm, preferably in the range of 10 m to 80 μm, and more preferably in the range of 15 μm to 40 μm. As the thickness of the substrate film decrease, the thickness is more preferable, in view of thinning the laminated film including this substrate film. Thinning the laminated film is preferable since devices or articles to which the laminated film is incorporated, for example, an image display device or a polarizing plate can be thinned. Here, in the laminated film having a cured layer on the substrate film, as the thickness of the substrate film decreases, a force of the substrate film for resisting the deformation of the cured layer tends to become weak, and thus curling easily occurs in the laminated film due to the curing shrinkage or a dimensional change of the cured layer. In this regard, in the laminated film according to an aspect of the present invention, the curing shrinkage or dimensional change of the cured layer can be suppressed, and thus deformation of the cured layer can be suppressed. Accordingly, even in a case where the thickness of the substrate film is thin, the occurrence of initial curling and the occurrence of the curling after a lapse of time in the laminated film can be effectively suppressed. Examples of the preferable substrate film include a cellulose acylate film having a thickness of 40 μm or less and an acrylic resin film having a thickness of 40 m or less.

(Other Additives)

With respect to additives that can be included in the resin film used as the substrate film, paragraphs 0024 to 0052 and 0073 to 0216 of JP2014-210905A can be also referred to.

<Absorbance Ratios P1/P2 and P2/P3>

With respect to the laminated film according to an aspect of the present invention, an absorbance ratio P1/P2 in an infrared absorption spectrum of the cured layer is in a range of 4.40 to 15.00, and an absorbance ratio P2/P3 is in a range of 0.01 to 0.08. P1, P2, and P3 are as described above. Each of P1, P2, and P3 is an absorbance at an absorption maximum peak in a wave number range described above, and in each of the absorption maximum peaks, the absorbance is a maximum value in each of the wave number ranges.

As described above, it is considered that, as the absorbance ratio P1/P2 is larger, the amount of hydroxyl groups that are retained in the hydroxyl group generated by the ring-opening of the alicyclic epoxy group without being subjected to the growth reaction and that exist in the cured layer is larger. The absorbance ratio P1/P2 is in the range of 4.40 to 15.00 in view of improvement of the surface hardness by the progress of the growth reaction and suppression of the occurrence of curling after a lapse of time due to the existence of the hydroxyl groups. In view of further suppressing the occurrence of curling after a lapse of time, the absorbance ratio P1/P2 is preferably 5.50 or greater and more preferably 7.00 or greater. In view of further improving the surface hardness and further suppressing the dimensional change of the cured layer, the absorbance ratio P1/P2 is preferably 13.00 or less and more preferably 10.00 or less.

As described above, it is considered that the absorbance ratio P2/P3 is a value that becomes an index of a ring opening rate of the alicyclic epoxy group of the alicyclic epoxy compound, and thus it is possible to achieve both of the improvement of the surface hardness and the suppression of the occurrence of curling after a lapse of time by ring-opening of the alicyclic epoxy groups to a degree in which the absorbance ratio P2/P3 becomes in the range of 0.01 to 0.08, performing growth reaction on a portion of the hydroxyl groups generated by ring opening to a degree of satisfying the absorbance ratio P2/P3 in the above range, and retaining a portion thereof. In this point of view, the absorbance ratio P2/P3 is preferably in the range of 0.02 to 0.06 and more preferably in the range of 0.03 to 0.05.

An infrared absorption spectrum of a measurement sample that can be obtained by removing a portion of the cured layer from the laminated film by a well-known method or the like is obtained by the measurement using a Fourier transform infrared spectrophotometer by a potassium bromide (KBr) pellet method, and P1, P2, and P3 can be calculated in the obtained infrared absorption spectrum.

The measurement by the KBr pellet method can be specifically performed by the following method.

KBr is pulverized in a mortar (for example, formed of agate), the above measurement sample is added thereto, and blending is performed such that the measurement sample and KBr are mixed well. For example, about 0.1 to 10 mg of the measurement sample is mixed with 100 mg of KBr. The amount of the measurement sample mixed with KBr may be adjusted such that the maximum peak intensity of absorbance (abs) in the range of 600 to 4,000 $cm^{-1}$ becomes in the range of 0.8 to 1.0.

A powder obtained by blending KBr and the measurement sample is compressed by a tableting machine to prepare a tablet sample. After this tablet sample is set in a Fourier transform infrared spectrophotometer, nitrogen purging is performed for 10 minutes, and the measurement is started, and the measurement is performed 600 to 4,000 $cm^{-1}$. Tablets manufactured only with KBr for background measurement are separately prepared, background measurement is performed by using tablets with only KBr, and the background portion is subtracted from the spectrum in a case of sample measurement, so as to correct the scattering loss of infrared light by the tablets and the influence of moisture adsorbed on KBr.

<Thickness of Cured Layer>

The thickness of the cured layer obtained by curing the above polymerizable composition may be determined according to the application and desirable physical properties of the laminated film having the cured layer, and is not particularly limited, but can be, for example, in the range of 1 to 50 μm. In the case where the laminated film having the cured layer is used as a polarizing plate protective film, the thickness of the cured layer is preferably in the range of 3 to 10 μm. In the laminated film according to one aspect of the present invention, assuming that the thickness of the substrate film is $t_T$ and the thickness of the cured layer is $t_H$, the unit of $t_T$ and $t_H$ is the same unit, and the thickness ratio $t_H/t_T$ is preferably 0.1 to and 1.0 and more preferably 0.2 to 0.7.

<Configuration of Laminated Film>

The laminated film according to an aspect of the present invention has a cured layer obtained by curing the polymerizable composition on the substrate film. The simplest configuration is a laminated film including a substrate film and the cured layer directly formed on the substrate film. Examples of other configurations include a configuration in which one or more layers are further laminated on the cured layer formed on the substrate film and a configuration in which one or more layers are included between the substrate film and the cured layer. Specific examples of the configuration of the laminated film include the following configurations. The description in parentheses below means that a layer having a function before parentheses may have a function in parentheses.

Substrate film/cured layer,
Substrate film/Cured layer/Layer of low refractive index,
Substrate film/Cured layer/Antiglare layer (Antistatic layer)/Layer of low refractive index,
Substrate film/Cured layer/Antiglare layer/Antistatic layer/Layer of low refractive index,
Substrate film/Cured layer/Antistatic layer/Antiglare layer/Layer of low refractive index,
Substrate film/Cured layer (Antistatic layer)/Antiglare layer/Layer of low refractive index,
Substrate film/Cured layer/Layer of high refractive index/Antistatic layer/Layer of low refractive index,
Substrate film/Cured layer/Layer of high refractive index (Antistatic layer)/Layer of low refractive index,
Substrate film/Cured layer/Antistatic layer/Layer of high refractive index/Layer of low refractive index,
Substrate film/Cured layer/Layer of medium refractive index/Layer of high refractive index (Antistatic layer)/Layer of low refractive index,
Substrate film/Cured layer/Layer of medium refractive index (Antistatic layer)/Layer of high refractive index/Layer of low refractive index,
Substrate film/Cured layer (Antistatic layer)/Layer of medium refractive index/Layer of high refractive index/Layer of low refractive index,
Substrate film/Antistatic layer/Hard coat layer/Layer of medium refractive index/Layer of high refractive index/Layer of low refractive index, and
Antistatic layer/Substrate film/Cured layer/Layer of medium refractive index/Layer of high refractive index/Layer of low refractive index.

Well-known techniques can be applied without limitation to each of the layers. The antistatic layer and the antiglare layer may have a function (hard coat properties) as a so-called hard coat. The layer of a high refractive index, the layer of a low refractive index, and the layer of a medium refractive index respectively refer to a layer in which a refractive index is high, a layer in which a refractive index is low, and a layer that has a refractive index between the layer of a high refractive index and the layer of a low refractive index, in the relation of refractive indexes of other layers, and the refractive indexes of respective layers are not particularly limited. For example, with respect to the layer of a low refractive index, paragraphs 0078 to 0090 of JP2015-004979A can be referred to.

The laminated film described above can be manufactured by forming a cured layer obtained by curing the polymerizable composition on a substrate film, by a coating step of forming a coating film by coating a substrate film with the polymerizable composition, a drying step of drying the coating film, and a curing step of curing the coating film after the drying step. The polymerizable composition may be directly applied to the substrate film or may be applied to one or more other layers provided on the substrate film. The curing step may be performed by heating or may be performed by light irradiation. Examples of light (ionizing radiation) to be irradiated for polymerization by light irradiation include X-rays, electron beams, ultraviolet rays, visible light, and infrared rays, and ultraviolet rays is widely used, in general. A manufacturing method suitable for manufacturing the laminated film is described below.

The laminated film described above can be used in various applications. For example, as a protective film of a polarizing plate which is a constituent member of a liquid crystal display device, it can be suitably used on the viewer side from the display device. The laminated film can be disposed on the outermost surface of the liquid crystal display device, or a front plate can be further disposed on the laminated film. The front plate is a member disposed on the viewer side of the display device in the liquid crystal display device, and is preferably a member disposed on the outermost surface of the liquid crystal display device. In the case of the front plate is disposed together with the laminated film in the liquid crystal display device, it is preferable that light reflection is reduced by providing a resin layer called an optical bonding layer or a direct bonding layer between the laminated film and the front plate, so as to improve the visibility.

The laminated film included as the protective film of the polarizing plate may also serve as the front plate.

[Method of Manufacturing Laminated Film]

An aspect of the present invention is a method of manufacturing a laminated film and relates to a method of manufacturing a laminated film including a coating step of forming a coating film by coating a substrate film with the polymerizable composition;

a drying step of drying the coating film; and a curing step of curing the coating film after the drying step, in which the curing step includes a first ultraviolet irradiation step of irradiating the coating film having a film surface temperature of 40° C. or lower with ultraviolet rays in an irradiation dose of 30 to 200 mJ/cm$^2$, and a second ultraviolet irradiation step of irradiating the coating film having a film surface temperature of 50° C. or higher with ultraviolet rays in an irradiation dose of 200 mJ/cm$^2$ or greater after the first ultraviolet irradiation step.

Since a cured layer in which the absorbance ratio P1/P2 and the absorbance ratio P2/P3 are in the range described above can be easily formed, the manufacturing method is suitable for the method of manufacturing the laminated film according to an aspect of the present invention. However, the laminated film according to an aspect of the present invention is not limited to a laminated film manufactured by the above manufacturing method.

Hereinafter, the manufacturing method is further described in detail.

<Coating Step>

As the method of coating the substrate film with the polymerizable composition, a well-known coating method can be used. Specific examples of the coating method include a dip coating method, an air knife coating method, a curtain coating method, a roller coating method, a wire bar coating method, a gravure coating method, a slide coating method or an extrusion coating method (a die coating method) (for example, a coating device disclosed in JP2003-164788A can be used), and a micro gravure coating method. Among these, a microgravure coating method and a die coating method are preferable. Depending on the coating amount in the coating step, the film thickness of the cured layer to be formed can be adjusted.

<Drying Step>

The drying step can be performed by arbitrarily combining one or more drying methods such as a method of disposing a substrate film having a coating film of the polymerizable composition in a heated atmosphere, a method of transporting the coating film in a heated atmosphere, and a method of blowing hot air onto the surface of the coating film. The atmosphere temperature of the dry atmosphere and the temperature of the warm air are not particularly limited as long as the temperatures are temperatures at which the coating film can be dried.

<Curing Step>

The curing step of curing the coating film after the drying step includes a first ultraviolet irradiation step of irradiating the coating film having a film surface temperature of 40° C. or lower with ultraviolet rays in an irradiation dose of 30 to 200 mJ/cm$^2$, and a second ultraviolet irradiation step of irradiating the coating film having a film surface temperature of 50° C. or higher with ultraviolet rays in an irradiation dose of 200 mJ/cm$^2$ or greater after the first ultraviolet irradiation step.

The curing step including the first ultraviolet irradiation step and the second ultraviolet irradiation step in this manner is preferably performed in an aspect of forming the coating film by using the polymerizable composition including the photopolymerization initiator as the radical polymerization initiator and the cation polymerization initiator.

The present inventors assumed the reason that it is preferable to perform the curing step including the first ultraviolet irradiation step and the second ultraviolet irradiation step as follows.

In a case where the film surface temperature in the first ultraviolet irradiation step is 40° C. or lower, the ring-opening reaction of the alicyclic epoxy group included in the alicyclic epoxy compound among the polymerizable compounds included in the coating film can be caused to progress prior to the polymerization reaction of the (meth) acryloyl group included in the polyfunctional (meth)acrylate compound. On the other hand, in a case where the polymerization reaction of the (meth)acryloyl group progresses prior to the ring-opening reaction of the alicyclic epoxy group, it is assumed that the ring-opening reaction of the alicyclic epoxy group hardly progress, or the progress thereof is delayed. It is considered that in a case where the irradiation dose of the ultraviolet rays applied in the first ultraviolet irradiation step is 30 mJ/cm$^2$ or greater, the ring-opening reaction of the alicyclic epoxy group can be promoted, and in a case where the irradiation dose is 200 mJ/cm$^2$ or less, the rapid progress of the growth reaction (formation of polymer) of the alicyclic epoxy compound can be suppressed. The present inventors assume that, in the first ultraviolet irradiation step, the generation of hydroxyl groups by ring-opening of the alicyclic epoxy group is promoted such that a portion of the generated hydroxyl groups can be maintained in the coating film.

The present inventors assume that, in the second ultraviolet irradiation step, the suppression of the hydroxyl group that is generated by ring-opening of the alicyclic epoxy group and is maintained in the coating film after the first ultraviolet irradiation step from being subjected to the growth reaction of the alicyclic epoxy compound and the progress of the polymerization reaction of the (meth)acryloyl group included in the polyfunctional (meth)acrylate compound contribute to the formation of a cured layer having high surface hardness. The present inventors assume that, performing the second ultraviolet irradiation step at the film surface temperature of the coating film at 50° C. or higher contributes to suppressing the hydroxyl group from being subjected to the growth reaction of the alicyclic epoxy compound, and causing the ultraviolet irradiation dose to be 200 mJ/cm$^2$ or greater contributes to the progress of the polymerization reaction of the (meth)acryloyl group.

However, the above is a guess, and does not limit the present invention at all.

The film surface temperature of the coating film in the first ultraviolet irradiation step is preferably in the range of 10° C. to 35° C. and more preferably in the range of 15° C. to 30° C.

The film surface temperature of the coating film in the second ultraviolet irradiation step is preferably in the range of 50° C. to 1,080° C. and more preferably in the range of 60° C. to 80° C.

The above film surface temperature can be controlled by the atmosphere temperature at which ultraviolet irradiation is performed, and can be measured with a contactless thermometer.

The irradiation dose of the ultraviolet rays in the first ultraviolet irradiation step is preferably in the range of 50 to 150 mJ/cm$^2$ and more preferably in the range of 70 to 130 mJ/cm$^2$.

The irradiation dose of the ultraviolet rays in the second ultraviolet irradiation step is preferably in the range of 300 to 1,500 mJ/cm$^2$ and more preferably in the range of 400 to 1,000 mJ/cm$^2$.

Each of the ultraviolet irradiation time in the first ultraviolet irradiation step and ultraviolet irradiation time in the second ultraviolet irradiation step, for example, is in the range of 1 to 20 seconds, but the present invention is not limited to this range.

In the first ultraviolet irradiation step and the second ultraviolet irradiation step, according to an aspect, it is preferable that the ultraviolet irradiation in the first ultraviolet irradiation step is performed by selectively blocking light in a wavelength of 280 nm or less included in the ultraviolet rays emitted from the ultraviolet light source or by selectively reducing the irradiation dose of the light in a wavelength of 280 nm or less included in the ultraviolet rays emitted from the ultraviolet light source, and the ultraviolet irradiation in the second ultraviolet irradiation step is performed by applying the light having an emission wavelength at least at a wavelength of 200 to 380 nm. This is because, it is considered that the reduction of the irradiation dose of the light in a wavelength of 280 nm or less contributes to increasing the ring opening rate of the alicyclic epoxy group included in the alicyclic epoxy compound, and the irradiation with the light having an emission wavelength in a wavelength of 200 to 380 nm contributes to the polymerization reaction of the (meth)acryloyl group included in the polyfunctional (meth)acrylate compound. At this point, the used combination of the radical polymerization initiator and the cation polymerization initiator is preferably a combination of the radical polymerization initiator having the maximum absorption wavelength λmax of 270 nm or less and the cation polymerization initiator having the maximum absorption wavelength λmax of greater than 270 nm. Since ultraviolet rays irradiated from a general ultraviolet light source include light having an emission wavelength in a wavelength range of 200 to 380 nm, ultraviolet irradiation in the second ultraviolet irradiation step can be performed by using a general ultraviolet light source. According to an aspect of the present invention, it is preferable that the ultraviolet irradiation in the first ultraviolet irradiation step is performed by reducing the irradiation dose in which the light having a wavelength of 280 nm or less among the light having the emission wavelength at a wavelength of 200 to 380 nm irradiated from a general ultraviolet light source is irradiated on the surface of the coating film or by blocking light having a wavelength of 280 nm or less from being applied to the coating film surface. It is preferable that the selective blocking of the light at a wavelength of 280 nm or less or selective reduction of the irradiation dose thereof is performed by disposing a member that can perform the selective blocking or the selective irradiation dose reduction between the ultraviolet light source and the coating film. As such a member, for example, a commercially available film (for example TECHNOLLOY series manufactured by Sumika Acryl Co., Ltd. and the like) can be used. The blocking rate of the light having a wavelength of 280 nm or less by the member, for example, is preferably 70% or greater, more preferably 80% or greater, even more preferably 90% or greater. As the blocking rate is higher, the blocking rate is more preferable. From the spectral transmittance spectrum (reference) measured without the member and the spectral transmittance spectrum measured by disposing the member, the blocking rate of light with a wavelength of 280 nm or less by the member can be obtained.

However, the above is one aspect, and it is preferable that the first ultraviolet irradiation step is performed without using the above member as one aspect.

After the curing step, it is also possible to optionally perform post-step such as cutting.

[Polarizing Plate]

An aspect of the present invention relates to a polarizing plate including a polarizer and the laminated film. The laminated film can function as a protective film (polarizing plate protective film) for protecting the polarizer. Generally, the liquid crystal display device includes a front plate on the viewer side from the display device, but the laminated film serving as the polarizing plate protective film may also serve as the front plate or may be included a front plate as another member.

As a polarizing plate, a polarizing plate having a configuration in which a polarizer layer (also referred to as a polarizing film or a polarizer) is positioned between two polarizing plate protective films is widely used currently. The polarizing plate according to an aspect of the present invention can also be a polarizing plate having the configuration. Among the two polarizing plate protective films included in the polarizing plate, the polarizing plate protective film positioned on the liquid crystal display element side in a case of being incorporated in the liquid crystal display device is referred to as an "inner side protective film", and the other polarizing plate protective film is referred to as an "outer side protective film". The laminated film according to an aspect of the present invention may be used as an inner side protective film and may also be used as an outer side protective film. In view of the protection of the polarizing plate and the liquid crystal display element, it is preferable that the laminated film is disposed such that the cured layer becomes the outermost layer of the polarizing plate.

The polarizing plate may be used as a front-side polarizing plate or may be used as a rear-side polarizing plate, and it is preferable to use the polarizing plate as at least a front-side polarizing plate.

The polarizing plate may include the lamination film according to one aspect of the present invention as one protective film and another film as the other protective film. Examples of other films include a cellulose acetate film which is generally used as a polarizing plate protective film. For example, a cellulose acetate film manufactured by a solution casting method and stretched in the width direction in a roll film form at a stretching ratio of 10% to 100% is preferable.

Examples of another film to be used as the other protective film include an optical compensation film having an optical compensation layer including an optically anisotropic layer. According to the optical compensation film (also referred to as a phase difference film), in the liquid crystal display device, the viewing angle characteristics of the screen can be improved. As the optical compensation film, a well-known optical compensation film can be used, and in view of widening an angle of view, the optical compensation film disclosed in JP2001-100042A is preferable.

The polarizer may be a so-called linear polarizer having a function of converting natural light into specific linearly polarized light. The polarizer is not particularly limited, but an absorptive polarizer can be used. As the absorptive polarizer, a generally used polarizer can be used, for example, all of an iodine-based polarizer, a dye-based polarizer using a dichroic dye, a polyene-based polarizer, and a polarizer using a wire grid can be used. An iodine-based polarizer and a dye-based polarizer can generally be manufactured by causing iodine or a dichroic dye to be adsorbed in a polyvinyl alcohol-based film and stretching the film. Examples of one preferable aspect of the polarizer include an iodine-dyed polyvinyl alcohol-based film. The thickness of the polarizer is not particularly limited but may be, for example, 0.1 μm to 50 μm. In view of thinning the polarizing plate, the thickness of the polarizer layer is preferably 30 μm or less and more preferably 20 μm or less.

The polarizer may be a so-called coating-type polarizer. With respect to the coating type polarizer, paragraphs 0052 and 0053 of JP2014-170202A can be referred to.

The laminated film used as a polarizer and a protective film can be bonded by a well-known method, for example, by using an adhesive. In the present invention and the present specification, an adhesive also includes a pressure sensitive adhesive. The curling of the protective film in the polarizing plate obtained by bonding the polarizer and the protective film becomes a cause of warping of the polarizing plate. In a liquid crystal display device in which a polarizing plate is bonded and incorporated to a liquid crystal display element (referred to as a liquid crystal cell), warping of the polarizing plate can cause warping of the liquid crystal cell, but the warping of the liquid crystal cell becomes a cause of display unevenness in the liquid crystal display device (specifically, light leakage occurring at the four corners of the liquid crystal cell). In order to thin the liquid crystal display device, recently, a thin glass substrate is used as a glass substrate that is generally included in a liquid crystal cell, but as the glass substrate becomes thinner, the warping of the liquid crystal cell easily occurs. On the other hand, according to the laminated film of an aspect of the present invention, the initial curling and the occurrence of curling after a lapse of time can be suppressed, and thus in a case where this laminated film is used as a polarizing plate protective film, it is possible to suppress the occurrence of the display unevenness caused and generated by the warping of the polarizing plate. This point is advantageous for suppressing occurrence of display unevenness in a thinned liquid crystal display device by thinning the glass substrate.

[Liquid Crystal Panel]

An aspect of the present invention relates to a liquid crystal panel which includes a front-side polarizing plate, a liquid crystal display element, and a rear-side polarizing plate, and in which the front-side polarizing plate is a laminated film according to an aspect of the present invention. The rear-side polarizing plate may be also a laminated film according to an aspect of the present invention. The polarizing plate and the liquid crystal display element can be bonded by a well-known method, for example, using an adhesive.

Examples of the liquid crystal display element include a twisted nematic (TN) type, a super-twisted nematic (STN) type, a triple super twisted nematic (TSTN) type, a multi-domain type, a vertical alignment (VA) type, an in plane switching (IPS) type, and an optically compensated bend (OCB) type. The liquid crystal display element generally has a configuration in which a liquid crystal layer is disposed between two glass substrates.

Examples of the liquid crystal display element include an in-cell touch panel element and an on-cell touch panel display device in which a touch panel function is incorporated in any one of the above liquid crystal display elements. Examples thereof also include a form in which mode in which a film type touch sensor is bonded to a liquid crystal display element.

The in-cell touch panel liquid crystal display element may be an in-cell touch panel liquid crystal display element in which a touch panel function of a resistive film type, a capacitive type, and an optical type is incorporated inside the liquid crystal display element a liquid crystal layer is interposed between two glass substrates. With respect to the in-cell touch panel liquid crystal display element, for example, well-known techniques such as JP2011-76602A and JP2011-222009A can be applied without limitation.

The on-cell touch panel liquid crystal display element is preferably an on-cell touch panel liquid crystal display element in which a touch panel function of a resistive film type, a capacitive type, and an optical type is incorporated between two glass substrates with a liquid crystal layer interposed therebetween and a polarizing plate. The on-cell touch panel liquid crystal display element is disclosed, for example, in JP2012-88683A.

[Liquid Crystal Display Device]

An aspect of the present invention relates to a liquid crystal display device including the liquid crystal panel described above and a backlight unit.

Details of the liquid crystal panel are as described above.

The backlight unit included in the liquid crystal display device is not particularly limited, and may be an edge light type backlight unit or may be a direct type backlight unit. The backlight unit may include a light source and one or more well-known members such as a diffusion plate, a reflection plate, a light guide plate, a brightness enhancement film, and a prism sheet.

The aspect of applying the laminated film according to an aspect of the present invention to a liquid crystal display device has been described above. However, the laminated film according to an aspect of the present invention can be used instead of a film included as a so-called hard coat film in various image display devices other than the liquid crystal display device. Examples of the image display device include a cathode ray tube (CRT) display, a plasma display (PDP; plasma display panel), an electroluminescence display (ELD), a fluorescent display (VFD; vacuum fluorescent display), and a field emission display (FED). The laminated film according to an aspect of the present invention can be used, for example, as a member disposed on the most viewer side of the image display device, and the cured layer included in the laminated film is preferably disposed in the outermost layer of the image display device.

EXAMPLES

Hereinafter, the present invention is specifically described with reference to examples. Materials, reagents, substance amounts, and proportions thereof, operations, and the like shown in the following examples can be appropriately changed without departing from the gist of the present invention. Therefore, the scope of the present invention is not limited to the following specific examples. Hereinafter, "%" means "mass %" unless described otherwise.

The various components used in examples and comparative examples are as follows.

<Alicyclic Epoxy Compound>

CELLOXIDE 2021P (Compound 2c described above): Difunctional alicyclic epoxy compound (manufactured by Daicel Corporation), A value: 126, B value: 0

CELLOXIDE 8000 (Compound 2a described above): Difunctional alicyclic epoxy compound (manufactured by Daicel Corporation), A value: 97, B value: 0

UVR-6110 (Compound 2c described above): Difunctional alicyclic epoxy compound (manufactured by The Dow Chemical Company), A value: 126, B value: 0

CYCLOMER M100 (3,4-epoxycyclohexylmethyl methacrylate): methacryloyl group-containing monofunctional alicyclic epoxy compound (manufactured by Daicel Corporation), A value: 196, B value: 0

Polymer A: Alicyclic epoxy compound (polymer) having the following repeating unit, A value: 214, B value: 0

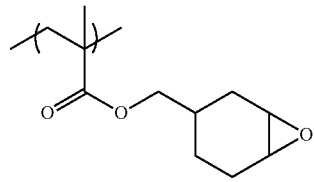

(Weight-Average Molecular Weight: 50,000)

(Synthesis of Polymer A)

10.0 g of methyl ethyl ketone was introduced to a 300-ml three-neck flask equipped with a stirrer, a thermometer, a reflux cooling pipe, and a nitrogen gas inlet tube, and the temperature was raised to 80° C. at the liquid temperature. Subsequently, a mixed solution consisting of 19.63 g (0.1 mol) of CYCLOMER M100 manufactured by Daicel Corporation, 10.0 g of methyl ethyl ketone, and 0.23 g of a thermal polymerization initiator (V-601 manufactured by Wako Pure Chemical Industries, Ltd.) was added dropwise at a constant speed such that the dropwise addition was completed over six hours. After the dropwise addition was completed, stirring was further continued for 12 hours, the solvent was distilled under reduced pressure and dried under reduced pressure at 80° C., so as to obtain 24.20 g of Polymer A. The weight-average molecular weight (Mw) of Polymer A was 50,000.

<Polyfunctional (meth)acrylate Compound>

DPHA: Dipentaerythritol hexaacrylate (hexafunctional, manufactured by Nippon Kayaku Co., Ltd.)

Pentaerythritol tetraacrylate (tetrafunctional, manufactured by Shin-Nakamura Chemical Co., Ltd.)

Pentaerythritol triacrylate (trifunctional, manufactured by Shin-Nakamura Chemical Co., Ltd.)

UV1700B: Urethane acrylate (decafunctional, manufactured by The Nippon Synthetic Chemical Industry Co., Ltd.)

M9050: Urethane acrylate (manufactured by Toagosei Co., Ltd.)

<Polymerization Initiator>

IRGACURE 184: Radical photopolymerization initiator (manufactured by BASF SE), λmax=244 nm CPI-101A: Cation photopolymerization initiator (manufactured by San-Apro Ltd.)

IRGACURE 250: Cation photopolymerization initiator (manufactured by BASF SE)

Cation photopolymerization initiator (I) below

Cation photopolymerization initiator (I), λmax=280 nm

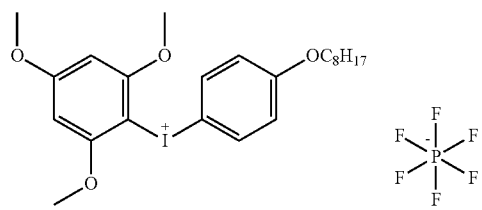

The above λmax is the maximum absorption wavelength measured with a solution prepared by dissolving each polymerization initiator in dichloromethane in a concentration of 0.005 mass % as a measurement sample with an ultraviolet-visible-near infrared spectrophotometer.

<Particulate Filler>

MEK-AC-2140Z: Methyl ethyl ketone (MEK) dispersion liquid of spherical silica particles having average particle diameter of 10 to 15 nm, and having polymerizable group polymerizable with (meth)acryloyl group on particle surface (manufactured by Nissan Chemical Industries, Ltd.)

AEROSIL NX90 (manufactured by Nippon Aerosil Co., Ltd.): Matte agent particle

AEROSIL R972 (manufactured by Nippon Aerosil Co., Ltd.): Matte agent particle

<Surfactant>

FP-1: Fluorine-containing compound (fluorine-based surfactant) below

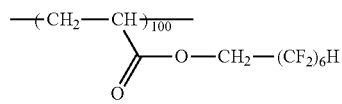

FP-1

<Other Components>

BS-371: Epoxyacrylate (manufactured by Arakawa Chemical Industries, Ltd.)

Glycidyl methacrylate (manufactured by Kyoeisha Chemical Co., Ltd.)

NK ESTER 701A: Difunctional acrylate (manufactured by Shin-Nakamura Chemical Co., Ltd.)

OXT-221: Oxetane (manufactured by Toagosei Co., Ltd.)

[Manufacturing of Substrate Film]

<Manufacturing of Acrylic Resin Film Having Thickness of 30 μm>

8,000 g of methyl methacrylate (MMA), 2,000 g of methyl 2-(hydroxymethyl) acrylate (MHMA), and 10,000 g of toluene as a polymerization solvent were introduced to a 30-L reaction vessel equipped with a stirrer, a temperature sensor, a cooling pipe, and a nitrogen gas inlet tube, nitrogen was caused to pass through this, and the temperature was raised to a liquid temperature of 105° C. In a case where reflux accompanied by the temperature rise was started, 10.0 g of t-amylperoxyisononanoate as a polymerization initiator was added, and a solution including 20.0 g of t-amylperoxyisononanoate and 100 g of toluene was added dropwise over two hours, solution polymerization was caused to progress under reflux at about 105° C. to 110° C., and aging for four hours was performed. The polymerization reaction rate was 96.6%, and the content (mass ratio) of MHMA in the obtained polymer was 20.0%.

Subsequently, 10 g of a stearyl phosphate-distearyl phosphate mixture (Phoslex A-18, manufactured by Sakai Chemical Industry Co., Ltd.) as a cyclization catalyst was added to the obtained polymerization solution, and the cyclization condensation reaction was caused to progress over five hours under reflux at about 80° C. to 100° C.

Subsequently, the obtained polymerization solution was introduced to a vent type screw biaxial extruder (diameter φ=29.75 mm, length L/diameter D=30) having one rear vent and four fore vents at a barrel temperature of 260° C. at a rotation speed of 100 rpm in a degree of pressure reduction of 13.3 to 400 hPa (10 to 300 mmHg), at a processing rate of 2.0 kg/hour in terms of a resin amount, cyclization condensation reaction and devolatilization were performed in the extruder. Subsequently, after completion of devolatilization, the resin in the hot melt state left in the extruder was discharged from the tip of the extruder and pelletized by a pelletizer, so as to obtain transparent pellets formed of an acrylic resin having a lactone ring structure in the main chain. The weight-average molecular weight of this resin was 148,000, the melt flow rate (obtained in conformity with JIS K7120, at the test temperature of 240° C. under the load of 10 kg) was 11.0 g/10 min, and the glass transition temperature was 130° C.

Subsequently, the obtained pellets and an acrylonitrile-styrene (AS) resin (trade name: TOYO AS AS20 manufactured by Toyo-Styrene Co., Ltd.) were extruded by using a single screw extruder (φ=30 mm) at a mass ratio of pellet/AS resin=90/10, so as to obtain transparent pellets having a glass transition temperature of 127° C.

Pellets of the resin composition manufactured above were melted and extruded from a coat hanger type T die by using a biaxial extruder to manufacture a resin film having a thickness of about 120 μm.

Subsequently, an acrylic resin film was manufactured by biaxially stretching the obtained unstretched resin film by 2.0 times in the machine direction (length direction) and 2.0 times in the lateral direction (width direction) simultaneously. The thickness of the acrylic resin film obtained in this manner was 30 μm.

<Manufacturing of Cellulose Acylate Films Having Thicknesses of 15 μm, 25 μm, and 40 μm>

(Manufacturing of Core Layer Cellulose Acylate Dope)

The following composition was put into a mixing tank and stirred, and respective components were dissolved, so as to prepare a cellulose acetate solution.

| | |
|---|---|
| Cellulose acetate having acetyl substitution degree of 2.88 and weight-average molecular weight of 260,000 | 100 parts by mass |
| Phthalic acid ester oligomer A | 10 parts by mass |
| Compound (A-1) | 4 parts by mass |
| Ultraviolet absorbing agent (compound in the following structural formula, manufactured by BASF SE) | 2.7 parts by mass |
| TINUVIN 123 (manufactured by BASF SE) | 0.18 parts by mass |
| TEKRAN DO (N-alkenylpropylenediamine triacetate, manufactured by Nagase ChemteX Corporation) | 0.02 parts by mass |
| Methylene chloride (first solvent) | 430 parts by mass |
| Methanol (second solvent) | 64 parts by mass |

Phthalic acid ester oligomer A Weight-average molecular weight: 750

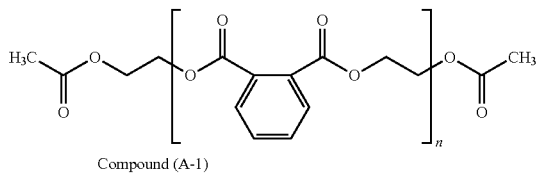

Compound (A-1)

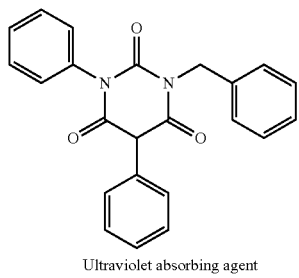

Ultraviolet absorbing agent

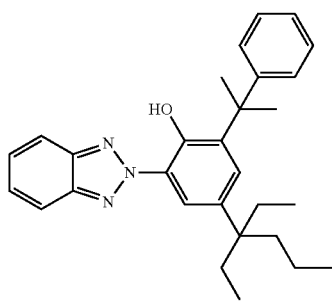

(Manufacturing of Outer Layer Cellulose Acylate Dope)

10 parts by mass of a solution below was added to 90 parts by mass of the core layer cellulose acylate dope so as to prepare an outer layer cellulose acetate solution.

| | |
|---|---|
| Silica particle having average particle diameter of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

Three layers of the core layer cellulose acylate dope and outer layer cellulose acylate dope on both sides thereof were simultaneously cast on a drum having a surface temperature of 20° C. from the casting port. The film was peeled off in a state in which the solvent content was about 20 mass %, both ends of the film in the width direction were fixed with tenter clips, and the film was dried in a state in which the retained solvent was 3 to 15%, by stretching the film 1.18 times in the lateral direction. Thereafter, the film was further dried by transporting the film between rolls of a heat treatment device to manufacture a cellulose acylate film. The thickness of the cellulose acylate film was adjusted according to the casting amount of the dope.

<Preparation of Polymerizable Composition>

Each component was added in the composition presented in Table 1 and was filtered through a polypropylene filter having a pore diameter of 10 μm to prepare a polymerizable composition used for forming a cured layer in the example and the comparative example. The numerical values in Table 1 represent contents with respect to the total amount of the solid content of each component. With respect to the solvent, the solvent ratio was adjusted so as to be the ratio presented in Table 1 to prepare a polymerizable composition having a concentration of solid contents of 35 mass %.

<Manufacturing of Laminated Film>

Laminated films S13 to S20, S22, and S23 in the examples were manufactured by a method below.

Each of the substrate films presented in Table 1 was wound in a roll shape, the polymerizable compositions presented in Table 1 were used, a coating amount in the coating step was adjusted such that the thickness of the cured layer after the curing step became the thickness presented in Table 1, so as to manufacture a laminated film having a cured layer on a substrate film. Specifically, each polymerizable composition was applied under the conditions of a transportation speed of 30 m/minute by a die coating method using a slot die disclosed in Example 1 of JP2006-122889A, the composition was dried for 150 seconds at an atmosphere temperature of 60° C., and the surface of the coating film was irradiated with ultraviolet rays in an irradiation dose presented in Table 1 in a temperature state in which the film surface temperature of the coating film was as presented in Table 1 by using an air cooling metal halide lamp (manufactured by Eye Graphics Co., Ltd.) of 160 W/cm at an oxygen concentration of about 0.1 volume % under nitrogen purge, so as to perform the first ultraviolet irradiation step. Thereafter, the surface of the coating film was irradiated with ultraviolet rays in a temperature state in which the film surface temperature of the coating film as presented in Table 1 in an irradiation dose as presented in Table 1 so as to perform the second ultraviolet irradiation step. The film surface temperature of the coating film was changed by changing the atmosphere temperature at which ultraviolet irradiation is performed, and the film surface temperature during the ultraviolet irradiation was measured with a contactless radiation-type thermometer.

The illuminance and the irradiation dose of ultraviolet rays disclosed in the examples were values measured with an eye UV ultraviolet light meter UVPF-A1 (PD-365) (manufactured by Iwasaki Electric Co., Ltd.).

The laminated film S21 of the example was manufactured in the same manner as the laminated films S13 to S20, S22, and S23 of the above examples except for performing ultraviolet irradiation in the first ultraviolet irradiation step by using the polymerizable composition presented in Table 1 as a polymerizable composition while a commercially available film (TECHNOLLOY C101 (thickness: 80 μm) manufactured by Sumika Acryl Co., Ltd.) was disposed between the air cooling metal halide lamp and the coating film surface. It was confirmed that the film used here was a film having properties of cutting light having a wavelength of 280 nm or less included in the irradiated ultraviolet rays by 94% by the method described above.

The laminated films S1 to S12 of the comparative examples were prepared in the same manner as in the laminated films S13 to S20, S22, and S23 of the examples except for using the polymerizable composition presented in Table 1 as the polymerizable composition and performing ultraviolet irradiation in an irradiation dose presented in Table 1 in a temperature state in which the film surface temperature of the coating film was as presented in Table 1 in one step.

<Method of Evaluating Laminated Film>
(Thickness of Cured Layer)

The thickness of the cured layer was calculated by measuring the thicknesses of the laminated films of the examples and the comparative examples with a contact type film thickness meter and subtracting the thickness of the substrate film measured in the same manner from the thickness, so as to confirm that the thickness was the same as the thickness presented in Table 1.

(Evaluation of Surface Hardness)

Pencil hardness evaluation disclosed in JIS K 5400 was performed. The laminated films of the examples and the comparative examples were humidified at a temperature of 25° C. and a relative humidity of 60% for two hours and measured for pencil hardness with a load of 4.9 N using a pencil for test specified in JIS S 6006 so as to determine the surface hardness from the measurement results in the following standard.

3H: A
2H: B
H: C (Evaluation of Initial Curling)

The laminated films of the examples and the comparative examples were cut out in a size of 60 mm×60 mm and were humidified for three or more hours under an environment of an atmosphere temperature of 25° C. and a relative humidity of 60%. Thereafter, the film was placed such that the curled surface faced upward, and a weight was placed on the film such that the film end surface was 1 cm, so as to measure the initial rising height of the end surface=the curl value (unit: mm). In the case where the film was curled such that the substrate film was curled inside, the curl value was positive, and in a case where the film was curled such that the cured layer was curled inside the curl value was negative. This evaluation was performed in the coating direction and in the direction perpendicular to the coating direction, and the determination was performed from an average value obtained by averaging values obtained in both directions in the following standard.

An absolute value was less than 2.0 mm: A
An absolute value was 2.0 mm or greater and less than 4.0 mm: B
An absolute value was 4.0 mm or greater: C (Calculation of Absorbance Ratios P1/P2 and P2/P3)

Samples (measurement samples) in which only the cured layers of the laminated films of the examples and the comparative examples were removed were collected. KBr was pulverized in an agate mortar, the measurement sample was added thereto, and blending was performed such that the measurement sample and KBr were mixed well. Here, 5 mg of the measurement sample was mixed for 100 mg of KBr.

A powder obtained by blending KBr and the measurement sample was compressed by a tabletting machine to prepare a tablet sample. After this tablet sample is set in a Fourier transform infrared spectrophotometer, nitrogen purging was performed for 10 minutes, and the measurement was started, and the measurement was performed 600 to 4,000 cm$^{-1}$. Tablets manufactured only with KBr for background measurement were separately prepared, background measurement was performed by using tablets with only KBr, and the background portion was subtracted from the spectrum in a case of sample measurement, so as to correct the scattering loss of infrared light by the tablets and the influence of moisture adsorbed on KBr.

The absorbances P1 to P3 were obtained in the infrared absorption spectrum obtained by the above measurement and the absorbance ratios P1/P2 and P2/P3 were calculated from P1 to P3 obtained. As a Fourier transform infrared spectrophotometer, a Fourier-transform infrared spectroscopy (FT-IR) device (NICOLET FTIR 6700 manufactured by Thermo Fisher Scientific Inc.) was used.

(Evaluation of Dimensional Stability of Laminated Film)

The laminated films of the examples and the comparative examples were cut such that the long side was 120 mm and the short side was 30 mm, humidifying was performed under the following conditions.

(1) Humidifying under the environment of atmosphere temperature of 25° C. and relative humidity of 60% for two hours (2) Humidifying under the environment of atmosphere temperature of 60° C. and relative humidity of 90% for 100 hours (3) Thereafter, humidifying under the environment of atmosphere temperature of 25° C. and relative humidity of 60% for 60 minutes At this point, the dimensional change rates of the film in the long side direction of (1) and (3) were measured, so as to perform evaluation in the following standards.

Less than 0.1%: A
0.1% to 0.2%: B
Greater than 0.2%: C

<Manufacturing of Polarizing Plate>
(Saponification of Film)

Laminated films manufactured in the examples and the comparative examples and a cellulose acylate film having a thickness of 25 μm manufactured by the same method as the film used as the substrate film in the manufacturing of the laminated films were immersed for one minute in a 4.5 mol/L aqueous solution of sodium hydroxide (saponification solution) of which the temperature was adjusted to a liquid temperature of 37° C., the film was washed with water, the film was immersed in a 0.05 mol/L aqueous solution of sulfuric acid for 30 seconds, and the film was further washed with water. Then, draining with an air knife was repeated three times, so as to drop water, the film was retained and dried in a drying zone at an atmosphere temperature of 70° C. for 15 seconds, so as to manufacture a saponified film.

(Manufacturing of Polarizer)

According to Example 1 of JP2001-141926A, a stretched polyvinyl alcohol-based film was adsorbed with iodine to manufacture a polarizer (iodine-dyed polyvinyl alcohol-based film) having a thickness of 7 μm.

(Manufacturing of Polarizing Plate (Bonding of Polarizer and Protective Film))

The polarizer manufactured above was interposed between a laminated film of the example or the comparative example saponified as described above as one protective film a cellulose acylate film having a thickness of 25 μm which was saponified above as the other protective film, and roll-to-roll bonding was performed using a 3% aqueous solution of polyvinyl alcohol (PVA, PVA-117H manufactured by Kuraray Co., Ltd.) as an adhesive, such that an absorption axis and the longitudinal direction of the film were orthogonal to each other, so as to manufacture the front-side polarizing plate. Here, in the laminated film of the example or the comparative example, the saponified substrate film surface and the polarizer were bonded. In this manner, polarizing plates of the examples and the comparative examples were obtained.

A rear-side polarizing plate was prepared in the same manner except for using two cellulose acylate films having a thickness of 25 μm saponified as described above.

<Method of Evaluating Warping of Polarizing Plate (Curling after a Lapse of Time)>

The polarizing plates of the examples and the comparative examples were bonded on one side of a glass having a size of 5.5 inch (0.1397 m) (aspect ratio of 16:9) and having a thickness of 0.3 mm such that the longitudinal direction of the polarizing plate and the short side direction of the glass were parallel to each other via a pressure sensitive adhesive. The polarizing plates of the examples and the comparative examples were bonded to the glass not on the laminated film side but on the cellulose acylate film side having a thickness of 25 μm. On the other surface of the glass, the above rear-side polarizing plate was bonded via a pressure sensitive adhesive such that the longitudinal direction of the polarizing plate and the long-side direction of the glass were parallel to each other.

The warpage amount of the polarizing plate manufactured in this manner was evaluated by exposing the polarizing plate-attached glass to an environment of an atmosphere temperature of 60° C. and a relative humidity of 90% for 100 hours and measuring a difference of heights of four corners and the center of the glass after being humidified for 60 minutes under the environment of an atmosphere temperature of 25° C. and a relative humidity of 60% with a laser displacement meter. In this case, the evaluation was performed in the following standards, setting the curl value to be positive in a case where the case where the film was curled so that the front-side polarizing plate was curled inside and setting the curl value to be negative in a case where the film was curled such that the rear-side polarizing plate was curled inside.

An absolute value was less than 0.3 mm: A
An absolute value was 0.3 to 0.6 mm: B
An absolute value was 0.6 mm or greater: C The above results are as presented in Table 1.

TABLE 1

| | | Polymerizable composition | | | | | | |
| --- | --- | --- | --- | --- | --- | --- | --- | --- |
| | | A1 | A2 | A3 | A4 | A5 | A6 | A7 |
| Alicyclic epoxy compound | CELLOXIDE 2021P | 30.0 | | | 15.0 | 15.0 | 15.0 | 15.0 |
| | CELLOXIDE 8000 | | | | | | | |
| | UVR-6110 | | 43.1 | | | | | |
| | CYCLOMER M100 | | | | | | | |
| | Polymer A | | | | | | | |
| Polyfunctional (meth)acrylate compound | DPHA | 70.0 | | 95.9 | 79.9 | 79.9 | 79.9 | |
| | Pentaerythritol tetraacrylate | | | | | | | |
| | Pentaerythritol triacrylate | | | | | | | |
| | UV1700B | | 19.1 | | | | | |
| | M9050 | | 9.6 | | | | | |
| Radical polymerization initiator | IRGACURE 184 | 4.0 | 1.9 | 4.0 | 4.0 | 4.0 | 4.0 | 4.0 |

TABLE 1-continued

| | | | | | | | | |
|---|---|---|---|---|---|---|---|---|
| Cation polymerization initiator | CPI-101A | 4.0 | | | | | | |
| | IRGACURE 250 | | 2.4 | | | | | |
| | Cation photopolymerization initiator (I) | | | 0.0 | 1.0 | 1.0 | 1.0 | 1.0 |
| Particulate filler | MEK-AC-2140Z | | | | | | | |
| | AEROSIL NX90 (matte agent particle) | | | | | | | |
| | AEROSIL R972 (matte agent particle) | | | | | | | |
| Surfactant | FP-1 | | | 0.1 | 0.1 | 0.1 | 0.1 | 0.1 |
| Other components | BS-371 | | 19.1 | | | | | |
| | Glycidyl methacrylate | | | | | | | |
| | NK ESTER 701A (difunctional acrylate) | | | | | | | 79.9 |
| | OXT-221 (Oxetane) | | 4.8 | | | | | |
| Solvent | Methyl ethyl ketone (MEK) | | 100% | 50% | 50% | 50% | 50% | 50% |
| | Methyl isobutyl ketone (MiBK) | 100% | | 50% | 50% | 50% | 50% | 50% |
| | Comparative Example/Example | Comparative Example | Comparative Example | Comparative Example | Comparative Example | Comparative Example | Comparative Example | Comparative Example |

| | | Polymerizable composition | | | | |
|---|---|---|---|---|---|---|
| | | A8 | A9 | A10 | A11 | A12 |
| Alicyclic epoxy compound | CELLOXIDE 2021P | 5.0 | 42.0 | 80.0 | | 8.0 |
| | CELLOXIDE 8000 | | | | | |
| | UVR-6110 | | | | | |
| | CYCLOMER M100 | | | | | |
| | Polymer A | | | | | |
| Polyfunctional (meth)acrylate compound | DPHA | 89.9 | 52.9 | 14.9 | 79.9 | 79.9 |
| | Pentaerythritol tetraacrylate | | | | | |
| | Pentaerythritol triacrylate | | | | | |
| | UV1700B | | | | | |
| | M9050 | | | | | |
| Radical polymerization initiator | IRGACURE 184 | 4.0 | 4.0 | 4.0 | 4.0 | 4.0 |
| Cation polymerization initiator | CPI-101A | | | | | |
| | IRGACURE 250 | | | | | |
| | Cation photopolymerization initiator (I) | 1.0 | 100 | 1.0 | 1.0 | 1.0 |
| Particulate filler | MEK-AC-2140Z | | | | | |
| | AEROSIL NX90 (matte agent particle) | | | | | |
| | AEROSIL R972 (matte agent particle) | | | | | |
| Surfactant | FP-1 | 0.1 | 0.1 | 0.1 | 0.1 | 0.1 |
| Other components | BS-371 | | | | | |
| | Glycidyl methacrylate | | | | | |
| | NK ESTER 701A (difunctional acrylate) | | | | 15.0 | |
| | OXT-221 (Oxetane) | | | | | 7.0 |
| Solvent | Methyl ethyl ketone (MEK) | 50% | 50% | 50% | 50% | 50% |
| | Methyl isobutyl ketone (MiBK) | 50% | 50% | 50% | 50% | 50% |
| | Comparative Example/Example | Comparative Example | Comparative Example | Comparative Example | Comparative Example | Comparative Example |

| | | Laminated film No. | | | | | | |
|---|---|---|---|---|---|---|---|---|
| | | S1 | S2 | S3 | S4 | S5 | S6 | S7 |
| | | Polymerizable composition No. | | | | | | |
| | | A1 | A2 | A3 | A4 | A5 | A6 | A7 |
| Layer configuration | Substrate film | 25 μm Cellulose acylate film | 25 μm Cellulose acylate film | 25 μm Cellulose acylate film | 25 μm Cellulose acylate film | 25 μm Cellulose acylate film | 25 μm Cellulose acylate film | 25 μm Cellulose acylate film |
| | Thickness of cured layer | 5.0 μm | 5.0 μm | 5.0 μm | 5.0 μm | 5.0 μm | 5.0 μm | 5.0 μm |

TABLE 1-continued

| | | | | | | | | |
|---|---|---|---|---|---|---|---|---|
| Ultraviolet irradiation condition | Film surface temperature | 30° C. | 25° C. | 25° C. | 25° C. | 80° C. | 25° C. | 25° C. |
| | Ultraviolet irradiation dose | 500 mJ/cm$^2$ | 100 mJ/cm$^2$ | 100 mJ/cm$^2$ | 100 mJ/cm$^2$ | 100 mJ/cm$^2$ | 600 mJ/cm$^2$ | 600 mJ/cm$^2$ |
| Evaluation result | P1/P2 | 3.00 | 2.78 | 1.00 | 3.00 | 2.78 | 3.36 | 3.36 |
| | P2/P3 | 0.20 | 0.17 | 0.00 | 0.11 | 0.08 | 0.08 | 0.06 |
| | Surface hardness | C | C | B | C | B | B | C |
| | Initial curling plate | C | C | C | C | C | C | C |
| | Dimensional stability of laminated film | C | C | C | C | C | C | C |
| | Warping of polarizing plate (curling after a lapse of time) | C | C | C | C | C | C | C |
| Comparative Example/Example | | Comparative Example | Comparative Example | Comparative Example | Comparative Example | Comparative Example | Comparative Example | Comparative Example |

| | | Laminated film No. | | | | |
|---|---|---|---|---|---|---|
| | | S8 | S9 | S10 | S11 | S12 |
| | | Polymerizable composition No. | | | | |
| | | A8 | A9 | A10 | A11 | A12 |
| Layer configuration | Substrate film | 25 μm Cellulose acylate film | 25 μm Cellulose acylate film | 25 μm Cellulose acylate film | 25 μm Cellulose acylate film | 25 μm Cellulose acylate film |
| | Thickness of cured layer | 5.0 μm | 5.0 μm | 5.0 μm | 5.0 μm | 5.0 μm |
| Ultraviolet irradiation condition | Film surface temperature | 25° C. | 25° C. | 25° C. | 25° C. | 25° C. |
| | Ultraviolet irradiation dose | 100 mJ/cm$^2$ | 100 mJ/cm$^2$ | 100 mJ/cm$^2$ | 600 mJ/cm$^2$ | 600 mJ/cm$^2$ |
| Evaluation result | P1/P2 | 2.57 | 7.00 | 16.00 | 1.80 | 2.60 |
| | P2/P3 | 0.08 | 0.13 | 0.18 | 0.18 | 0.14 |
| | Surface hardness | B | C | C | C | C |
| | Initial curling plate | C | B | C | C | C |
| | Dimensional stability of laminated film | C | C | C | C | C |
| | Warping of polarizing plate (curling after a lapse of time) | C | C | C | C | C |
| Comparative Example/Example | | Comparative Example | Comparative Example | Comparative Example | Comparative Example | Comparative Example |

| | | Polymerizable composition | | | | | |
|---|---|---|---|---|---|---|---|
| | | A13 | A14 | A15 | A16 | A17 | A18 |
| Alicyclic epoxy compound | CELLOXIDE 2021P | 15.0 | | | | | |
| | CELLOXIDE 8000 | | 15.0 | | | | |
| | UVR-6110 | | | | | | |
| | CYCLOMER M100 | | | 15.0 | 20.0 | | 20.0 |
| | Polymer A | | | | | 15.0 | |
| Polyfunctional (meth)acrylate compound | DPHA | 79.9 | 79.9 | 79.9 | 59.9 | 79.9 | 59.9 |
| | Pentaerythritol tetraacrylate | | | | | | |
| | Pentaerythritol triacrylate | | | | | | |
| | UV1700B | | | | | | |
| | M9050 | | | | | | |
| Radical polymerization initiator | IRGACURE 184 | 4.0 | 4.0 | 4.0 | 4.0 | 4.0 | 4.0 |
| Cation polymerization initiator | CPI-101A | | | | | | |
| | IRGACURE250 | | | | | | |
| | Cation photopolymerization initiator (I) | 1.0 | 1.0 | 1.0 | 1.0 | 1.0 | 1.0 |
| Particulate filler | MEK-AC-2140Z | | | | | | |
| | AEROSIL NX90 (matte agent particle) | | | | 15.0 | 15.0 | 15.0 |
| | AEROSIL R972 (matte agent particle) | | | | | | |
| Surfactant | FP-1 | 0.1 | 0.1 | 0.1 | 0.1 | 0.1 | 0.1 |
| Other components | BS-371 | | | | | | |
| | Glycidyl methacrylate | | | | | | |
| | NK ESTER 701A (difunctional acrylate) | | | | | | |
| | OXT-221 (Oxetane) | | | | | | |

TABLE 1-continued

| Solvent | Methyl ethyl ketone (MEK) | 50% | 50% | 50% | 50% | 50% | 50% |
|---|---|---|---|---|---|---|---|
| | Methyl isobutyl ketone (MiBK) | 50% | 50% | 50% | 50% | 50% | 50% |
| Comparative Example/Example | | Example | Example | Example | Example | Example | Example |

| | | Polymerizable composition | | | | |
|---|---|---|---|---|---|---|
| | | A19 | A20 | A21 | A22 | A23 |
| Alicyclic epoxy compound | CELLOXIDE 2021P | | | | | |
| | CELLOXIDE 8000 | | | | | |
| | UVR-6110 | | | | | |
| | CYCLOMER M100 | 20.0 | 20.0 | 20.0 | 20.0 | 20.0 |
| | Polymer A | | | | | |
| Polyfunctional (meth)acrylate compound | DPHA | 59.9 | 59.9 | 59.9 | 59.9 | 59.9 |
| | Pentaerythritol tetraacrylate | | | | | |
| | Pentaerythritol triacrylate | | | | | |
| | UV1700B | | | | | |
| | M9050 | | | | | |
| Radical polymerization initiator | IRGACURE 184 | 4.0 | 4.0 | 4.0 | 4.0 | 4.0 |
| Cation polymerization initiator | CPI-101A | | | | | |
| | IRGACURE250 | | | | | |
| | Cation photopolymerization initiator (I) | 1.0 | 1.0 | 1.0 | 1.0 | 1.0 |
| Particulate filler | MEK-AC-2140Z | 15.0 | 15.0 | 15.0 | 15.0 | 15.0 |
| | AEROSIL NX90 (matte agent particle) | | | | 0.5 | |
| | AEROSIL R972 (matte agent particle) | | | | | 3.0 |
| Surfactant | FP-1 | 0.1 | 0.1 | 0.1 | 0.1 | 0.1 |
| Other components | BS-371 | | | | | |
| | Glycidyl methacrylate | | | | | |
| | NK ESTER 701A (difunctional acrylate) | | | | | |
| | OXT-221 (Oxetane) | | | | | |
| Solvent | Methyl ethyl ketone (MEK) | 50% | 50% | 50% | 50% | 50% |
| | Methyl isobutyl ketone (MiBK) | 50% | 50% | 50% | 50% | 50% |
| Comparative Example/Example | | Example | Example | Example | Example | Example |

| | | Laminated film No | | | | | |
|---|---|---|---|---|---|---|---|
| | | S13 | S14 | S15 | S16 | S17 | S18 |
| | | Polymerizable composition No. | | | | | |
| | | A13 | A14 | A15 | A16 | A17 | A18 |
| Layer configuration | Substrate film | 25 μm Cellulose acylate film | 25 μm Cellulose acylate film | 25 μm Cellulose acylate film | 25 μm Cellulose acylate film | 25 μm Cellulose acylate film | 30 μm Acrylic resin film |
| | Thickness of cured layer | 5.0 μm | 5.0 μm | 5.0 μm | 5.0 μm | 5.0 μm | 5.0 μm |
| Ultraviolet irradiation condition | Film surface temperature and ultraviolet irradiation dose of first ultraviolet irradiation step | 25° C. 60 mJ/cm$^2$ | 25° C. 60 mJ/cm$^2$ | 25° C. 60 mJ/cm$^2$ | 25° C. 60 mJ/cm$^2$ | 25° C. 60 mJ/cm$^2$ | 25° C. 60 mJ/cm$^2$ |
| | Film surface temperature and ultraviolet irradiation dose of second ultraviolet irradiation step | 60° C. 500 mJ/cm$^2$ | 60° C. 500 mJ/cm$^2$ | 60° C. 500 mJ/cm$^2$ | 60° C. 500 mJ/cm$^2$ | 60° C. 500 mJ/cm$^2$ | 60° C. 500 mJ/cm$^2$ |
| Evaluation result | P1/P2 | 4.90 | 5.00 | 4.47 | 5.50 | 5.30 | 5.50 |
| | P2/P3 | 0.06 | 0.06 | 0.03 | 0.06 | 0.08 | 0.06 |
| | Surface hardness | B | B | A | A | B | B |
| | Initial curling | B | B | B | A | A | A |
| | Dimensional stability of laminated film | B | B | B | B | B | A |
| | Warping of polarizing plate (curling after a lapse of time) | B | B | B | B | B | A |
| Comparative Example/Example | | Example | Example | Example | Example | Example | Example |

TABLE 1-continued

|  |  | Laminated film No | | | | |
|---|---|---|---|---|---|---|
|  |  | S19 | S20 | S21 | S22 | S23 |
|  |  | Polymerizable composition No. | | | | |
|  |  | A19 | A20 | A21 | A22 | A23 |
| Layer configuration | Substrate film | 40 μm Cellulose acylate film | 15 μm Cellulose acylate film | 25 μm Cellulose acylate film | 25 μm Cellulose acylate film | 25 μm Cellulose acylate film |
|  | Thickness of cured layer | 5.0 μm | 5.0 μm | 5.0 μm | 5.0 μm | 5.0 μm |
| Ultraviolet irradiation condition | Film surface temperature and ultraviolet irradiation dose of first ultraviolet irradiation step | 25° C. 60 mJ/cm$^2$ | 25° C. 60 mJ/cm$^2$ | 25° C. 60 mJ/cm$^2$ (film disposition) | 25° C. 60 mJ/cm$^2$ | 25° C. 60 mJ/cm$^2$ |
|  | Film surface temperature and ultraviolet irradiation dose of second ultraviolet irradiation step | 60° C. 500 mJ/cm$^2$ | 60° C. 500 mJ/cm$^2$ | 60° C. 500 mJ/cm$^2$ | 60° C. 500 mJ/cm$^2$ | 60° C. 500 mJ/cm$^2$ |
| Evaluation result | P1/P2 | 5.50 | 5.50 | 7.49 | 5.50 | 5.50 |
|  | P2/P3 | 0.06 | 0.06 | 0.04 | 0.06 | 0.06 |
|  | Surface hardness | A | B | A | A | A |
|  | Initial curling | A | A | A | A | A |
|  | Dimensional stability of laminated film | A | A | A | B | B |
|  | Warping of polarizing plate (curling after a lapse of time) | A | A | A | B | B |
|  | Comparative Example/Example | Example | Example | Example | Example | Example |

From the results presented in Table 1, in the laminated film of the example, surface hardness was high, occurrence of initial curling was suppressed, and dimensional stability was excellent. Therefore, it was confirmed that the occurrence of warping of the polarizing plate in a case of being applied as a polarizing plate protective film was able to be suppressed.

<Manufacturing of Liquid Crystal Display Device>

The front-side polarizing plate of a commercially available IPS type liquid crystal television (42 LS5600 manufactured by LG Electronics) was peeled and removed, polarizing plates of the examples and comparative examples were used as the front-side polarizing plate instead, such that the absorption axis was in the longitudinal direction (horizontal direction) via a pressure sensitive adhesive such that the cured layer became the outermost surface, so as to obtain a liquid crystal display device.

The present invention is useful in technical fields of various image display devices.

What is claimed is:

1. A laminated film comprising:
a substrate film; and
a cured layer obtained by curing a polymerizable composition,
wherein the polymerizable composition includes
a compound having a cyclic ether group;
a polyfunctional (meth)acrylate compound having three or more (meth)acryloyl groups in one molecule;
a radical polymerization initiator; and
a cation polymerization initiator,
wherein the compound having a cyclic ether group at least includes an alicyclic epoxy compound including one or more alicyclic epoxy groups in one molecule,
wherein, in the alicyclic epoxy compound, a value obtained by dividing a molecular weight by the number of alicyclic epoxy groups included in one molecule is in a range of 80 to 250, and a value obtained by dividing the number of cyclic ether groups other than the alicyclic epoxy groups included in one molecule by a molecular weight is in a range of 0 to 0.002,
wherein a content of the alicyclic epoxy compound with respect to a total amount of a solid content of the polymerizable composition is in a range of 10.0 to 40.0 mass %,
wherein a content of the compound having a cyclic ether group other than the alicyclic epoxy compound of the polymerizable composition is 5.0 mass % or less,
wherein an absorbance ratio P1/P2 in an infrared absorption spectrum of the cured layer is in a range of 4.40 to 15.00, and an absorbance ratio P2/P3 is in a range of 0.01 to 0.08,
wherein P1 is an absorbance at an absorption maximum peak in a wave number range of 3,650 to 3,200 cm$^{-1}$,
wherein P2 is an absorbance at an absorption maximum peak in a wave number range of 800 to 770 cm$^{-1}$, and
wherein P3 is an absorbance at an absorption maximum peak in a wave number range of 1,740 to 1,690 cm$^{-1}$.

2. The laminated film according to claim 1,
wherein the polymerizable composition includes a particulate filler having a reactive group reactive with at least one of an alicyclic epoxy group or a (meth)acryloyl group on an inorganic particle surface by 5.0 to 40.0 mass %, with respect to a total amount of a solid content of a polymerizable composition.

3. The laminated film according to claim 1,
wherein the alicyclic epoxy group included in the alicyclic epoxy compound includes a 3,4-epoxycyclohexyl group.

4. The laminated film according to claim 1,
wherein the alicyclic epoxy compound further includes one or more (meth)acryloyl groups in one molecule.

5. The laminated film according to claim 1,
wherein the alicyclic epoxy compound includes 3,4-epoxycyclohexylmethyl (meth)acrylate.

6. The laminated film according to claim 1,
wherein the substrate film is a cellulose acylate film having a thickness of 40 μm or less.

7. The laminated film according to claim 1,
wherein the substrate film is an acrylic resin film having a thickness of 40 μm or less.

8. A method of manufacturing the laminated film,
wherein the laminated film is the laminated film according to claim 1,
the method comprises:
a coating step of coating a substrate film with the polymerizable composition to form a coating film;
a drying step of drying the coating film; and
a curing step of curing the coating film after the drying step,
wherein the curing step includes
a first ultraviolet irradiation step of irradiating the coating film having a film surface temperature of 40° C. or lower with ultraviolet rays in an irradiation dose of 30 to 200 mJ/cm², and
a second ultraviolet irradiation step of irradiating the coating film having a film surface temperature of 50° C. or higher with ultraviolet rays in an irradiation dose of 200 mJ/cm² or greater after the first ultraviolet irradiation step.

9. The method of manufacturing the laminated film according to claim 8,
wherein ultraviolet irradiation in the first ultraviolet irradiation step is performed by selectively blocking light in a wavelength of 280 nm or less included in ultraviolet rays emitted from an ultraviolet light source or by selectively reducing an irradiation dose of light having a wavelength of 280 nm or less included in ultraviolet rays emitted from an ultraviolet light source, and
wherein, ultraviolet irradiation in the second ultraviolet irradiation step is performed by irradiation with light having an emission wavelength at least in a wavelength of 200 to 380 nm.

10. The method of manufacturing a laminated film according to claim 9,
wherein the selective blocking or the selective reducing of the irradiation dose is performed by disposing a member that is able to perform the selective blocking or the selective reducing of the irradiation dose between the ultraviolet light source and the coating film.

11. A polarizing plate comprising:
a polarizer; and
the laminated film according to claim 1.

12. A liquid crystal panel comprising:
a front-side polarizing plate;
a liquid crystal display element; and
a rear-side polarizing plate,
wherein the front-side polarizing plate is the polarizing plate according to claim 11.

13. A liquid crystal display device comprising:
the liquid crystal panel according to claim 12; and
a backlight unit.

* * * * *